(12) United States Patent
Sato

(10) Patent No.: US 8,525,783 B2
(45) Date of Patent: Sep. 3, 2013

(54) STORAGE MEDIUM STORING INFORMATION PROCESSING PROGRAM AND INFORMATION PROCESSING DEVICE

(75) Inventor: Kenta Sato, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1780 days.

(21) Appl. No.: 11/882,808

(22) Filed: Aug. 6, 2007

(65) Prior Publication Data

US 2008/0309615 A1      Dec. 18, 2008

(30) Foreign Application Priority Data

Jun. 13, 2007   (JP) ................................. 2007-156721

(51) Int. Cl.
*G06F 3/033*   (2013.01)
*G09G 5/08*    (2006.01)
*G06T 15/00*   (2011.01)

(52) U.S. Cl.
USPC .......................................... 345/158; 345/419

(58) Field of Classification Search
USPC ................... 345/156–184, 418–428; 382/276
See application file for complete search history.

(56) References Cited

U.S. PATENT DOCUMENTS

| | | | | |
|---|---|---|---|---|
| 5,889,528 | A * | 3/1999 | Zhao | 345/648 |
| 5,966,129 | A * | 10/1999 | Matsukuma et al. | 345/418 |
| 6,320,988 | B1 * | 11/2001 | Yamaguchi et al. | 382/276 |
| 6,768,489 | B2 * | 7/2004 | Jeong et al. | 345/474 |
| 7,489,299 | B2 * | 2/2009 | Liberty et al. | 345/163 |
| 7,819,748 | B2 * | 10/2010 | Ajioka | 463/37 |

FOREIGN PATENT DOCUMENTS

| | | |
|---|---|---|
| JP | 63036385 | 2/1988 |
| JP | 6-50758 | 2/1994 |
| JP | 2000149056 | 5/2000 |

OTHER PUBLICATIONS

Japanese Patent Application No. 2007-156721 Notice of Reasons for Rejection from Japanese Patent Office issued Feb. 17, 2012.

* cited by examiner

*Primary Examiner* — Bipin Shalwala
*Assistant Examiner* — Steven Holton
(74) *Attorney, Agent, or Firm* — Nixon & Vanderhye P.C.

(57) ABSTRACT

An object has a plurality of joints 51 to 55 which are connected to each other. A game apparatus calculates, when one of the plurality of joints having a fixed position with respect to the object is set as a reference joint, an orientation of an adjacent joint connected to the reference joint with respect to the reference joint (an orientation of an adjacent bone) based on input data. Then, the game apparatus moves a position of the adjacent joint connected to the reference joint based on the calculated orientation, and further moves the joints other than the reference joint and the adjacent joint in accordance with the adjacent joint being moved. Furthermore, the game apparatus causes a display device to display the object in which a shape thereof is determined based on positions of the aforementioned joints which have been moved.

15 Claims, 12 Drawing Sheets

STORAGE MEDIUM STORING INFORMATION PROCESSING PROGRAM AND INFORMATION PROCESSING DEVICE

CROSS REFERENCE TO RELATED APPLICATION

The disclosure of Japanese Patent Application No. 2007-156721, filed Jun. 13, 2007, is incorporated herein by reference.

BACKGROUND OF THE INVENTION

1. Field of the Invention

The present invention relates to an information processing program and an information processing device, and more particularly to an information processing program and an information processing device capable of causing an object in a virtual space to perform an action in accordance with a motion of an input device itself.

2. Description of the Background Art

Conventionally, an information processing system which performs an operation by moving an input device itself has been proposed. For example, patent document 1 (Japanese Laid-Open Patent Publication No. 6-50758) discloses an input device accommodating a vibration gyroscope. In the input device, a direction in which a remote commander (input device) is waved is determined based on an angular velocity obtained by the vibration gyroscope, and a command corresponding to the determination result is executed. For example, based on the angular velocity obtained by the vibration gyroscope, whether the remote commander is waved upward or downward is determined. When it is determined that the remote commander is waved upward, a cursor displayed on a screen is moved upward accordingly. On the other hand, when it is determined that the remote commander is waved downward, the cursor is moved downward accordingly. As such, the cursor can be moved in the same direction as that in which the remote commander is moved, thereby making it possible to perform an intuitive input operation.

According to a technique disclosed in patent document 1, in the case where an object to be operated is simply composed such as a cursor, it is possible to control an action of the object. On the contrary, in the case where the object to be operated is complexly composed of a plurality of parts, the action of the object cannot be controlled. In other words, there is only one type of value (angular velocity) representing the motion of the input device, whereas there are a plurality of targets to be controlled (the plurality of parts of the object). Thus, even if utilizing the technique disclosed in patent document 1, each of the plurality of parts of the object cannot be controlled.

SUMMARY OF THE INVENTION

Therefore, an object of the present invention is to provide an information processing program and an information processing program capable of causing a complex object to perform an action in accordance with the motion of the input device itself.

The present invention has the following features to attain the object mentioned above. The reference numerals, step numbers and the like in the parentheses indicate the correspondence with the embodiment described below in order to aid in understanding the present invention and are not intended to limit, in any way, the scope of the present invention.

A first aspect is directed to a computer-readable storage medium storing an information processing program (game program 60) to be executed by a computer (CPU 10) of an information processing device (game apparatus 3) which causes an object (player object 50) in a virtual space (game space) to perform an action based on an input value (acceleration vector) varied in accordance with a motion of an input device (controller 5). The object has a plurality of connection points (joints) connected to each other, and a shape of the object is determined based on positional relationships between the plurality of connection points. The information processing program causes the computer to execute: an input data obtaining step (S3); an orientation calculating step (S4, S5 and S11); a connection point moving step (S14); and a display step (S8). In the input data obtaining step, the computer obtains input data (acceleration data) representing the input value. In the orientation calculating step, the computer calculates, when a predetermined one of the plurality of connection points of the object is set as a reference point (reference joint), an orientation of an adjacent connection point (adjacent joint) connected to the reference point with respect to the reference point (orientation of adjacent bone) based on the input data. In the connection point moving step, the computer moves positions of the connection points other than the reference point based on the orientation calculated in the orientation calculating step. In the display step, the computer causes a display device (television 2) to display the object in which the shape thereof is determined based on the reference positional relationships between the plurality of connection points obtained after the connection point moving step.

In a second aspect, in the connection point moving step, the computer may calculate the positions to be moved for the connection points other than the reference point in an order from a nearest to a furthest point from the reference point.

In a third aspect, the orientation calculating step may include a motion calculating step (S4 and S5) and a calculation executing step (S11). In the motion calculating step, the computer calculates motion data (65) representing the motion of the input device based on the input data. In the calculation executing step, the computer calculates the orientation of the adjacent connection point with respect to the reference point based on the motion data.

In a fourth aspect, in the input data obtaining step, the computer obtains acceleration data outputted from an acceleration sensor included in the input device as the input data.

In a fifth aspect, the motion calculating step may include a smoothing step (S4) and a difference calculating step (S5). In the smoothing step, the computer calculates smoothed data (following acceleration data 64) representing a value into which a value of the acceleration data obtained in the input data obtaining step is smoothed. In the difference calculating step, the computer calculates data, as the motion data, representing a difference between the value of the acceleration data obtained in the input data obtaining step and the value represented by the smoothed data.

In a sixth aspect, the acceleration sensor may detect acceleration of the input device along a predetermined axis direction. In this case, in the motion calculating step, the computer calculates the motion data representing the motion of the input device in the predetermined axis direction.

In a seventh aspect, a reference orientation of the adjacent connection point with respect to the reference point may be previously defined. In this case, in the motion calculating step, the computer calculates the motion data representing the motion of the input device in a predetermined direction (X-axis direction). In the calculation executing step, the computer determines a direction to which the orientation of the adjacent connection point with respect to the reference point is varied with respect to the reference orientation based on whether the motion of the input device represented by the motion data is a positive direction or a negative direction with respect to the predetermined direction.

In an eighth aspect, the information processing program may cause the computer to further execute an object moving step (S34) of moving the object based on a movement amount (joint velocity), of each of the connection points other than the reference point, calculated in the connection point moving step.

In a ninth aspect, the information processing program may cause the computer to further execute an orientation varying step (S35) of varying an orientation of the object based on an orientation (of fourth bone 59) of a line connecting an endmost connection point (fifth joint 55) included in the connection points other than the reference point to a connection point (fourth joint 54) connected to the endmost connection point.

The present invention may be provided with an information processing device having a function equivalent to that of the information processing device executing the aforementioned steps of the first to ninth aspects.

According to the first aspect, the orientation of the adjacent connection point with respect to the reference point is varied in accordance with the motion of the input device, and the positions of the connection points other than the adjacent connection point are accordingly moved in accordance with the varied orientation of the adjacent connection point, thereby making it possible to cause a complex object, for example, having a plurality of connection points, to perform an action in accordance with the motion of the input device itself. Therefore, it becomes possible to provide a player with an unprecedented operation which operates an object composed of a plurality of parts in accordance with the motion of the input device.

According to the second aspect, for the positions of the connection points, the positions which have not yet been determined are sequentially calculated based on those which have already been determined. Thus, it becomes possible to easily calculate the position of each of the connection points to be moved.

According to the third aspect, the orientation of the adjacent connection point with respect to the reference point can be varied in accordance with the motion of the input device. Furthermore, according to the seventh aspect, the aforementioned orientation to be varied with respect to the reference point is determined in accordance with the direction in which the input device is moved. Thus, for example, an operation of waving the input device left and right allows the object to perform an action of waving its body in a predetermined direction.

According to the fourth aspect, by using the acceleration sensor, the motion of the input device can be easily calculated. Furthermore, according to the fifth aspect, by calculating the difference between the acceleration detected by the acceleration sensor and the value into which the acceleration is smoothed, the motion of the input device can be more accurately calculated. Furthermore, according to the sixth aspect, the motion of the input device can be calculated with a simple configuration.

According to the eighth aspect, the object is moved based on the movement amount, of each of the connection points, calculated in the connection point moving step. Here, in the case where the object is moved in accordance with the orientation calculated in the orientation calculating step, both an action of the object (a movement of each of the connection points) and a movement of the object are determined based on the orientation of the object determined by an input operation. Therefore, in accordance with the input operation, the object is caused to perform an action as well as being moved. It is more natural that the object moves as a result of performing an action. However, in the above case, a motion in which the object moves as a result of performing an action cannot be expressed in a realistic manner. On the contrary, according to the eighth aspect, the motion of the input device exerts an influence on the movement amount of each of the connection points (the action of the object), and then the movement amount exerts an influence on the movement of the object. Thus, it becomes possible to express a motion in which "the object moves as a result of performing an action" in a more realistic manner.

According to the ninth aspect, the orientation of the object is determined based on the orientation of the line connecting the endmost connection point to the connection point connected thereto. Therefore, the action of the object is determined in accordance with the input operation, and then the orientation of the object is varied in accordance with the action of the object. Thus, it becomes possible to express a motion in which "the orientation of the object varies as a result of performing an action (as a result of the connection points being moved).

These and other objects, features, aspects and advantages of the present invention will become more apparent from the following detailed description of the present invention when taken in conjunction with the accompanying drawings.

DESCRIPTION OF THE PREFERRED EMBODIMENTS (Overall Configuration of Game System)

Figure 1:
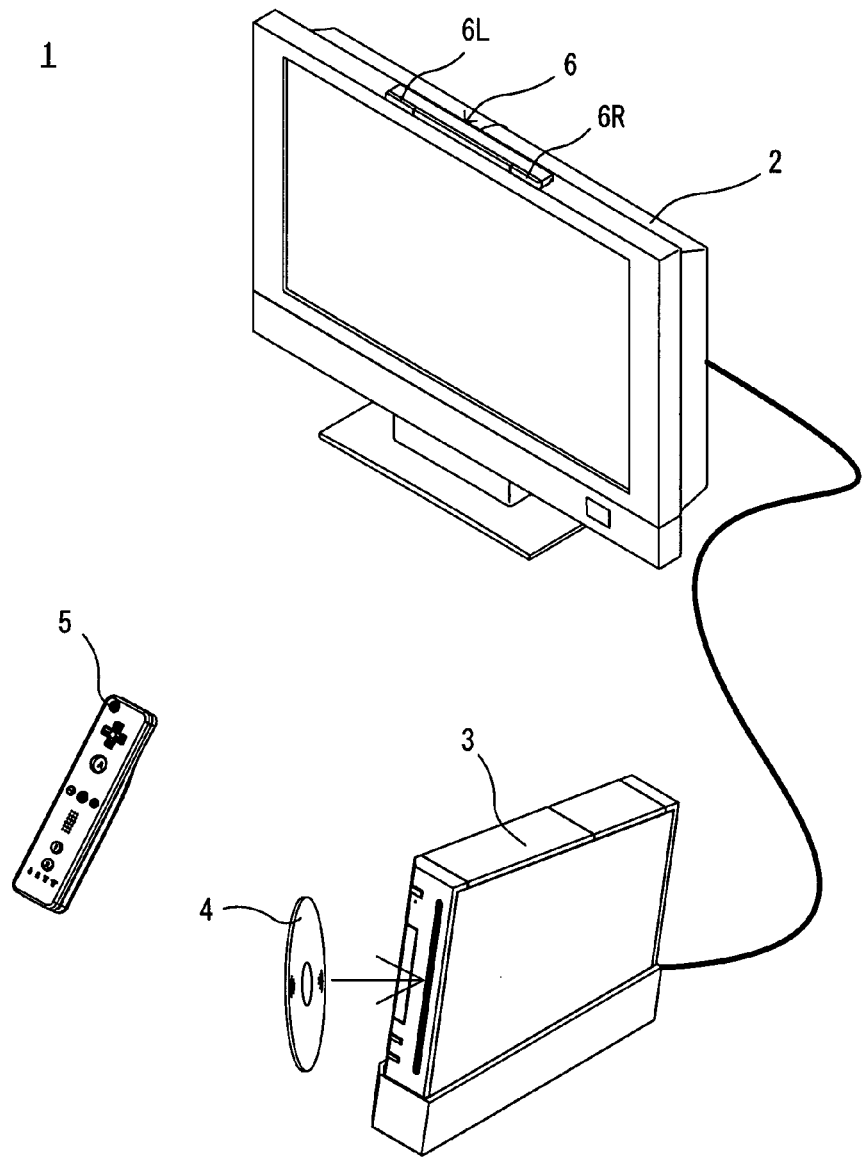
FIG. 1 is an external view illustrating a game system 1 according to an embodiment of the present invention.

With reference to FIG. 1, a game system 1 including a game apparatus according to an embodiment of the present invention will be described. FIG. 1 is an external view illustrating the game system 1. Hereinafter, the game apparatus and a game program of the present invention will be described by using a stationary game apparatus as an example. In FIG. 1, the game system 1 includes a television receiver (hereinafter simply referred to as "television") 2, a game apparatus 3, an optical disc 4, a controller 5, and a marker section 6. The present system causes the game apparatus 3 to execute a game processing in accordance with a game operation using the controller 5.

To the game apparatus 3, the optical disc 4, which is an exemplary information storage medium exchangeably used for the game apparatus 3, is detachably inserted. On the optical disc 4, a game program to be executed by the game apparatus 3 is stored. An insertion slot for the optical disc 4 is provided at the front face of the game apparatus 3. The game apparatus 3 executes the game processing by reading and executing the game program stored on the optical disc 4 inserted through the insertion slot.

To the game apparatus 3, the television 2, which is an exemplary display apparatus, is connected via a connection cord. The television 2 displays a game image obtained as a result of the game processing executed by the game apparatus 3. Further, on the periphery of a screen of the television 2 (an upper side of the screen in FIG. 1), the marker section 6 is provided. The marker section 6 has two markers 6R and 6L located at both ends thereof. The marker 6R (as well as the marker 6L) is specifically composed of one or more infrared LEDs, and outputs infrared light forward from the television 2. The marker section 6 is connected to the game apparatus 3, and the game apparatus 3 is capable of controlling lighting of respective red infrared LEDs contained in the marker section 6.

The controller 5 is an input device for providing the game apparatus 3 with operation data representing a content of an operation applied to the controller 5. The controller 5 and the game apparatus 3 are connected to each other by wireless communication. In the present embodiment, a technique of Bluetooth (registered trademark), for example, is used for the wireless communication between the controller 5 and the game apparatus 3. In another embodiment, the controller 5 and the game apparatus 3 may be connected to each other via a fixed line.

(Internal Configuration of Game Apparatus 3)

Figure 2:
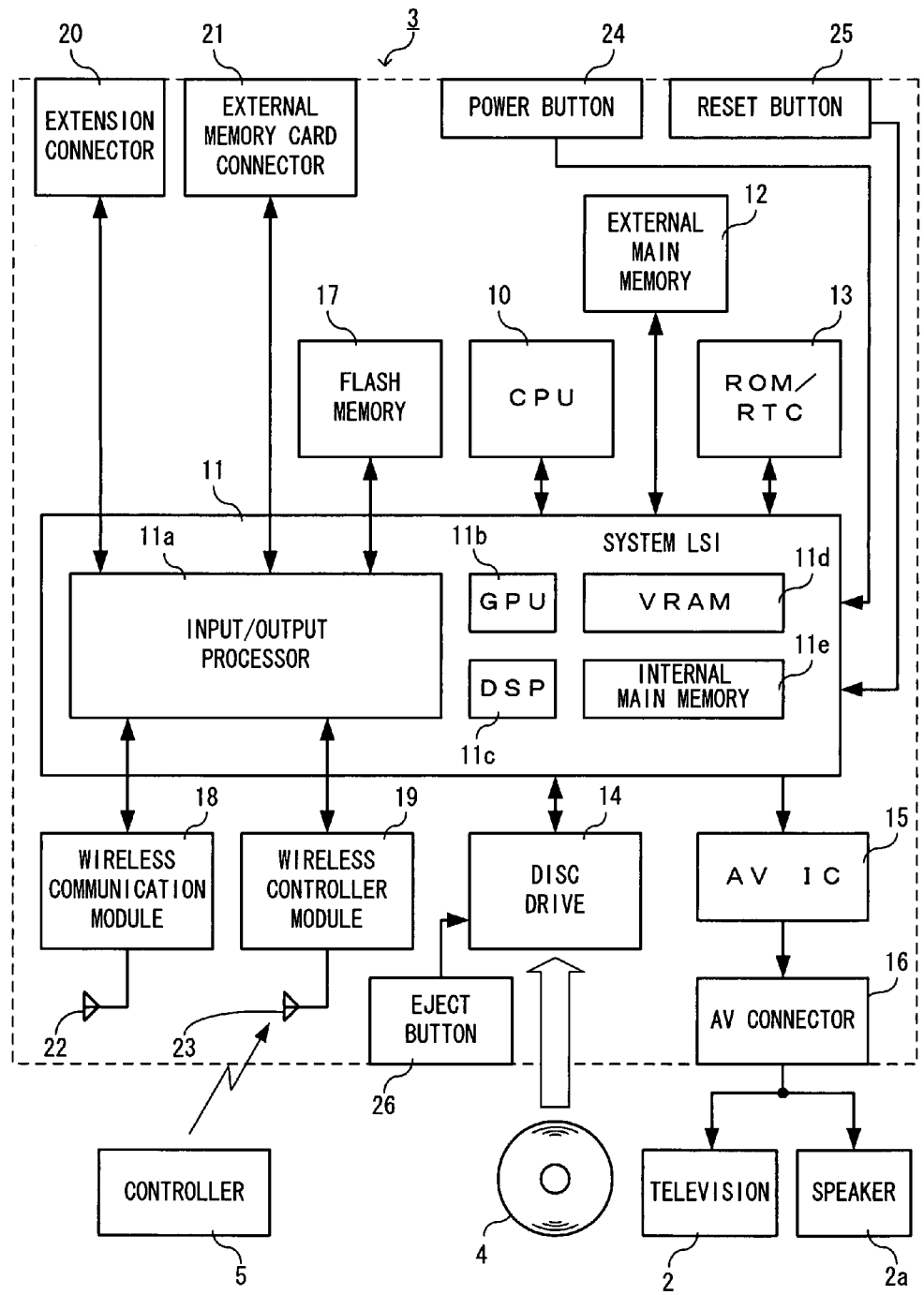
FIG. 2 is a functional block diagram illustrating a configuration of a game apparatus 3.

Next, with reference to FIG. 2, an internal configuration of the game apparatus 3 will be described. FIG. 2 is a functional block diagram illustrating a configuration of the game apparatus 3. The game apparatus 3 includes a CPU10, a system LSI 11, an external main memory 12, a ROM/RTC 13, a disc drive 14, an AV-IC 15, and the like.

The CPU10 executes the game processing by causing the game program stored on the optical disc 4 to be executed, and functions as a game processor. The CPU10 is connected to the system LSI 11. In addition to the CPU10, the external main memory 12, the ROM/RTC 13, the disc drive 14, and the AV-IC 15 are connected to the system LSI 11. The system LSI 11 performs processing such as control of data transmission between respective component parts connected thereto, generation of an image to be displayed, and obtainment of data from an external apparatus. An internal configuration of the system LSI will be described later. The external main memory 12, which is of a volatile type, stores programs such as a game programs read from the optical disc and the flash memory 17, and other various data, and is used as a work area and buffer space for the CPU10. The ROM/RTC 13 includes a ROM (so-called a boot ROM) incorporating a program booting the game apparatus 3, and a clock circuit for counting time (RTC: Real Time Clock). The disc drive 14 reads, from the optical disc 4, the program data, texture data and the like, and writes the read data into an internal main memory 11e described later, or the external main memory 12.

Further, provided in the system LSI 11 are an input/output (I/O) processor 11a, a GPU (Graphics Processor Unit) 11b, a DSP (Digital Signal Processor) 11c, a VRAM 11d, and the internal main memory 11e. These component parts 11a to 11e are, though not shown in diagrams, connected to one another via an internal bus.

The GPU11b forms a part of drawing means, and generates an image in accordance with a graphics command (draw command) from the CPU10. The VRAM 11d stores data (such as polygon data and the texture data) necessary for the GPU11b to execute the graphics command. When an image is generated, the GPU 11b generates the image data by using the data stored in the VRAM 11d.

The DSP 11c functions as an audio processor, and generates audio data by using sound data and sound waveform (tone quality) data stored in the internal main memory 11e and the external main memory 12.

The image data and the audio data generated as above described, is read by the AV-IC 15. The AV-IC 15 outputs the read image data to the television 2 via an AV connector 16, and also outputs the read audio data to a speaker 2a embedded in the television 2. Accordingly, the image is displayed on the television 2, and the sound is outputted from the speaker 2a.

The I/O processor 11a executes data transmission with component parts connected thereto and data downloading from an external apparatus. The I/O processor 11a is connected to the flash memory 17, a wireless communication module 18, a wireless controller module 19, an extension connector 20, and an external memory card connector 21. To the wireless communication module 18, an antenna 22 is connected, and to the wireless controller module 19, an antenna 23 is connected.

The I/O processor 11a is connected to a network via the wireless communication module 18 and the antenna 22 and is capable of communicating with other game apparatuses or various servers connected to the network. The I/O processor 11a accesses the flash memory 17 at regular intervals so as to detect data, if any, necessary to transmit to the network. If the data is detected, the detected data is transmitted to the network via the wireless communication module 18 and the antenna 22. Further, the I/O processor 11a receives data transmitted from the other game apparatuses or downloaded from a download server via the network, the antenna 22 or the wireless communication module 22, and stores the received data in the flash memory 17. The CPU10 executes the game program so as to read the data stored in the flash memory 17 and causes the game program to use the read data. In the flash memory 17, not only the data transmitted between the game apparatus 3 and the other game apparatuses or the various servers, but also save data of a game (result data or intermediate step data of the game) played by using the game apparatus 3 may be stored.

Further, the I/O processor 11a receives the operation data transmitted from the controller 22 via the antenna 23 and the wired controller module 19, and (temporarily) stores the operation data in the internal main memory 11e or in a buffer space of the external main memory 12.

Further, to the I/O processor 11a, the extension connector 20 and the external memory card connector 21 are connected. The extension connector 20 is a connector for an interface such as a USB and a SCSI, and is capable of performing communication with the network, instead of the wireless communication module 18, by connecting thereto a medium such as an external storage, a peripheral device such as another controller, or a wired communication connector. The external memory card connector 21 is a connector for connecting the external storage medium such as the memory card. For example, the I/O processor 11a accesses the external storage medium via the extension connector 20 or the external memory card connector 21, and then saves data or reads data.

Provided to the game apparatus 3 are a power button 24, a reset button, 25, and an eject button 26. The power button 24 and the reset button 25 are connected to the system LSI 11. When the power button 24 is turned on, the power is supplied to the respective component parts of the game apparatus 3 via an AC adapter which is not shown. When the reset button 25 is pressed, the system LSI 11 reactivates a boot program of the game apparatus 3. The eject button 26 is connected to the disc drive 14. When the eject button 26 is pressed, the optical disc 4 is ejected from the disc drive 14.

(Configuration of Controller 5)

Figure 3:
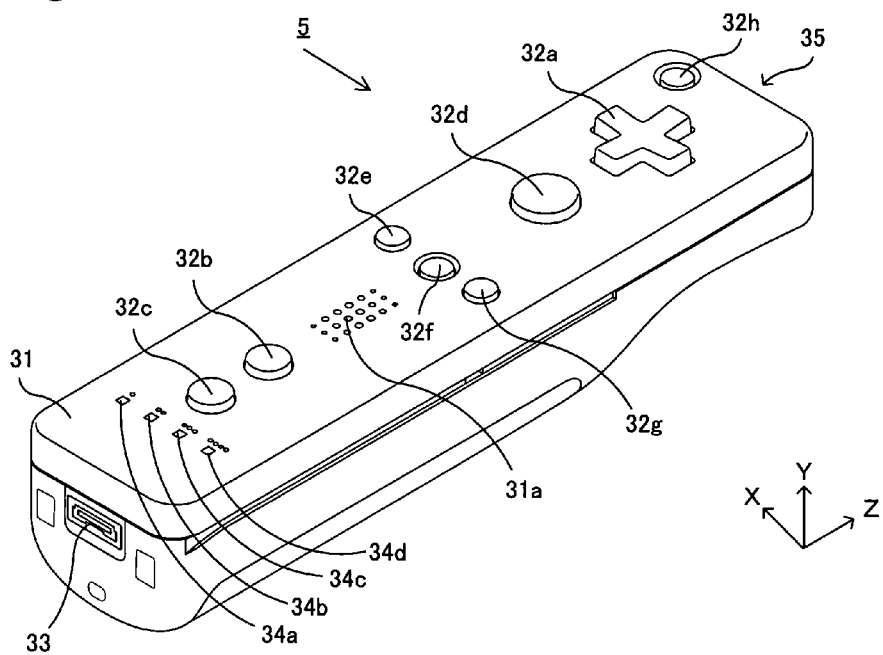
FIG. 3 is a perspective view illustrating an external configuration of a controller 5.
Figure 4:
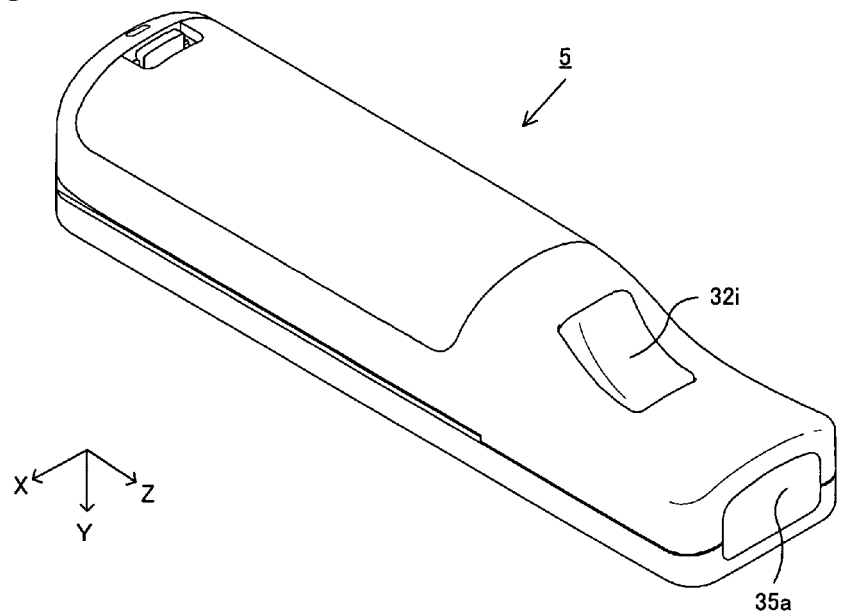
FIG. 4 is a perspective view illustrating the external configuration of the controller 5.
Figure 6:
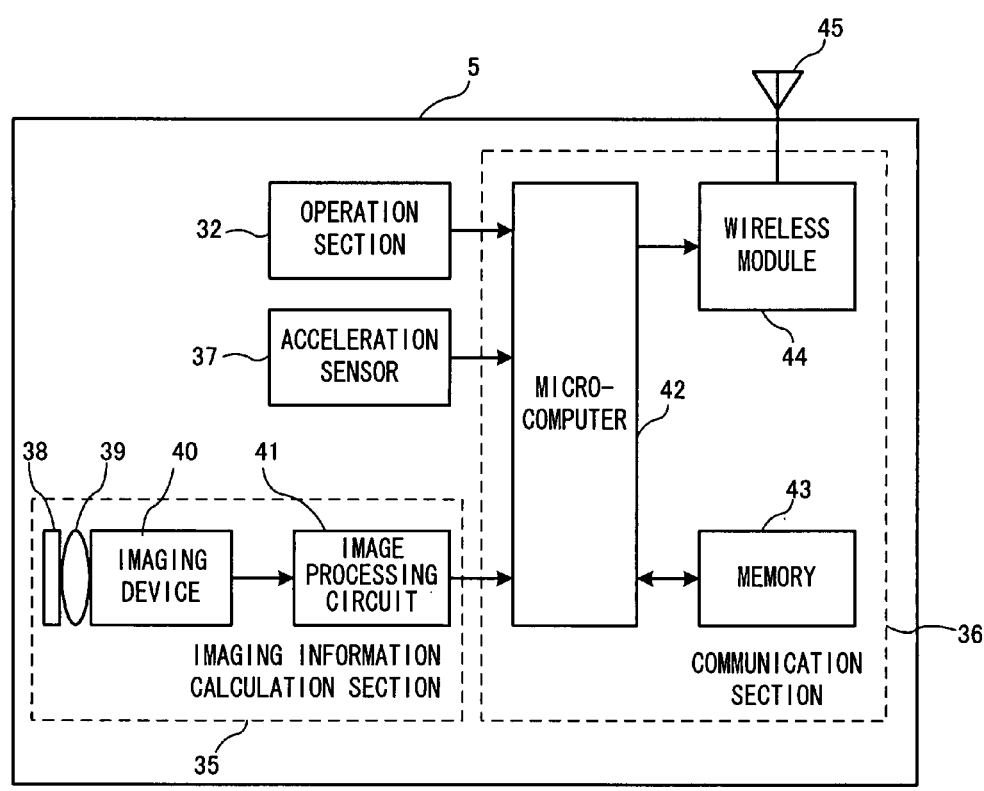
FIG. 6 is a block diagram illustrating a configuration of the controller 5.

With reference to FIGS. 3 and 6, the controller 5 will be described. FIGS. 3 and 4 are perspective views illustrating an external configuration of the controller 5. FIG. 3 is a perspective view of the controller 5 as viewed from a top rear side thereof. FIG. 4 is a perspective view of the controller 5 as viewed from a bottom front side thereof.

In FIGS. 3 and 4, the controller 5 includes a housing 31 which is formed by, for example, plastic molding. The housing 31 has a substantially parallelepiped shape extending in a longitudinal direction from front to rear (a Z-axis direction shown in FIG. 3), and an overall size thereof is small enough to be held by one hand of an adult or even a child. A player can play a game by pressing buttons provided on the controller 5 or by moving the controller 5 itself so as to change a position or posture thereof.

The housing 31 includes a plurality of operation buttons. As shown in FIG. 3, on a top surface of the housing 31, a cross button 32a, a NO. 1 button 32b, a NO. 2 button 32c, an A button 32d, a minus button 32e, a home button 32f, a plus button 32g and a power button 32h are provided. In the following description, the top surface of the housing 31 having these buttons 32a to 32h thereon may be referred to as a "button surface". As shown in FIG. 4, on a bottom surface of the housing 31, a recessed portion is formed. On a rear side slope surface of the recessed portion, a B button 32i is provided. Various operational functions are assigned to the operation buttons 32a to 32i in accordance with the game program executed by the game apparatus 3. The power button 32h is a button for turning on and off the power to the game apparatus 3 by remote control. The home button 32f and the power button 32h have top surfaces thereof buried in the top surface of the housing 31 so as to prevent the home button 32f and the power button 32h from being mistakenly pressed by the player.

On a rear surface of the housing 31, a connector 33 is provided. The connector 33 is used for connecting the controller 5 to other devices (e.g., other controllers).

In a rear portion of the top surface of the housing 31, a plurality of LEDs (four in FIG. 3) 34a to 34d are provided. Note that a controller type (number) is assigned to the controller 5 such that the controller 5 is distinguishable from the other controllers 5. The LEDs 34a to 34d are used for, e.g., informing the player of the controller type which is currently set for the controller 5 or of a remaining battery charge of the controller 5. Specifically, when the game operation is performed using the controller 5, one of the plurality of LEDs 34a to 34d which corresponds to the controller type of the controller 5 is lit up.

Figure 5A:
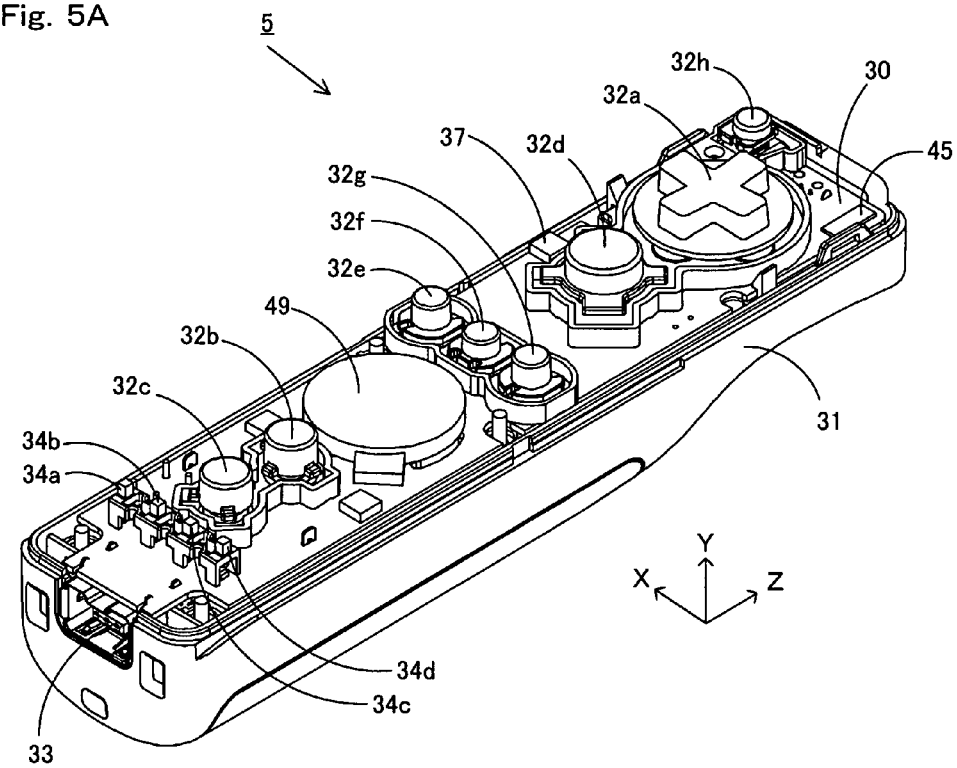
FIG. 5A is a perspective view illustrating an internal configuration of the controller 5.
Figure 5B:
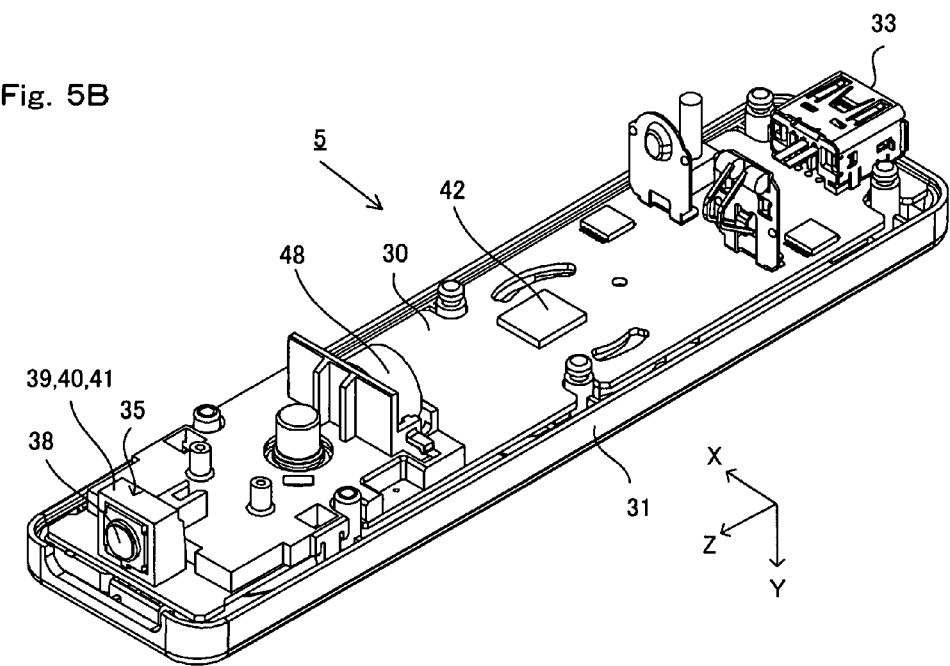
FIG. 5B is a perspective view illustrating the internal configuration of the controller 5.

Furthermore, the controller 5 has an imaging information calculation section 35 (FIG. 5B). As shown in FIG. 4, on a front surface of the housing 31, a light incident surface 35a included in the imaging information calculation section 35 is provided. The light incident surface 35a is formed by a material which allows at least an infrared radiation incident from the markers 6R and 6L to pass through.

A speaker hole 31a for emitting a sound from a speaker 49 (FIG. 5A) embedded in the controller 5 to outside is formed between the NO. 1 button 32b and the home button 32f provided on the top surface of the housing 31.

With reference to FIGS. 5A and 5B, an internal configuration of the controller 5 will be described. FIGS. 5A and 5B are views illustrating the internal configuration of the controller 5. Note that FIG. 5A is a perspective view of the controller 5 in a state where an upper casing (a part of the housing 31) of the controller 5 is removed. FIG. 5B is a perspective view of the controller 5 in a state where a lower casing (a part of the housing 31) of the controller 5 is removed. FIG. 5B is a perspective view of a substrate 30 as viewed from a reverse side of the substrate 30 shown in FIG. 5A.

As shown in FIG. 5A, the substrate 30 is fixed inside the housing 31. Provided, on a top main surface of the substrate 30, are the operation buttons 32a to 32h, the LEDs 34a to 34d, an acceleration sensor 37, an antenna 45, the speaker 49 and the like. These elements are connected to a microcomputer (Micro Computer) 42 (see FIG. 5B) by lines (not shown) formed on the substrate 30 or the like. In the present embodiment, the acceleration sensor 37 is located at a position displaced from the center of the controller 5 with respect to an X-axis direction. Thus, a motion of the controller 5 when being rotated about a Z-axis is more easily calculated. Furthermore, the acceleration sensor 37 is located in front of the center of the controller 5 with respect to the longitudinal direction (the Z-axis direction). A wireless module 44 (FIG. 6) and the antenna 45 allow the controller 5 to act as a wireless controller.

As shown in FIG. 5B, at a front edge of a bottom main surface of the substrate 30, the imaging information calculation section 35 is provided. The imaging information calculation section 35 includes an infrared filter 38, a lens 39 and an image processing circuit 41 which are located in this order from the front side of the controller 5. These elements 38 to 41 are attached to the bottom main surface of the substrate 30.

Furthermore, on the bottom main surface of the substrate 30, the microcomputer 42 and a vibrator 48 are attached. The vibrator 48 may be, for example, a vibration motor or a solenoid. The vibrator 48 is connected to the microcomputer 42 by the lines formed on the substrate 30 or the like. The controller 5 is vibrated when the vibrator 48 is turned on in accordance with an instruction from the microcomputer 42. Thus, a so-called vibration-feedback game in which vibration is conveyed to the player holding the controller 5 is realized. In the present embodiment, the vibrator 48 is located at a relatively front side of the housing 31. That is, the vibrator 48 is located at a position displaced from the center of the controller 5 toward one end thereof, thereby allowing the vibration generated by the vibrator 48 to vibrate the overall controller 5 to a large extent. At a rear edge of the bottom main surface of the substrate 30, the connector 33 is attached. Although not shown in FIGS. 5A and 5B, the controller 5 further includes a quartz oscillator for generating a reference clock of the microcomputer 42, an amplifier for outputting an audio signal to the speaker 49, and the like.

Note that a shape of the controller 5, shapes of the operation buttons, and the number or mounted positions of the acceleration sensors or vibrators, all of which are shown in FIGS. 3 to 5A and 5B, are merely examples. The present invention can be realized by using other shapes, numbers and mounted positions for the aforementioned elements. Further, in the present embodiment, an imaging direction in which imaging means picks up an image is a Z-axis positive direction. However, the imaging direction may be any other directions. In other words, the imaging information calculation section 35 (the light incident surface 35a of the imaging information calculation section 35) of the controller 5 may not be provided on the top surface of the housing 31. The imaging information calculation section 35 (the light incident surface 35a) may be provided on other surfaces of the housing 31 only if the element can capture a light from outside the housing 31.

FIG. 6 is a block diagram illustrating a configuration of the controller 5. The controller 5 includes an operation section 32 (the operation buttons 32a to 32i), the connector 33, the imaging information calculation section 35, the communication section 36 and the acceleration sensor 37. The controller 5 provides the game apparatus 3 with data representing a content of an operation applied to the controller 5 as the operation data.

The operation section 32 includes the above-described operation buttons 32a to 32i, and outputs operation button data representing an input state of each of the operation buttons 32a to 32i (i.e., representing whether or not each of the operation buttons 32a to 32i is pressed) to the microcomputer 42 of the communication section 36.

The imaging information calculation section 35 is a system for analyzing image data picked up by the imaging means, thereby identifying an area having a high brightness in the image data and calculating a position of a gravity center, a size and the like of the area. The imaging information calculation section 35 has, for example, a maximum sampling period of about 200 frames/sec, and therefore can trace and analyze even a relatively fast motion of the controller 5.

The imaging information calculation section 35 includes the infrared filter 38, the lens 39, the image pickup element 40 and the image processing circuit 41. The infrared filter 38 allows only an infrared radiation in the light incident on the front side of the controller 5 to pass therethrough. The lens 39 converges the infrared radiation which has passed through the infrared filter 38, and outputs the infrared radiation to the image pickup element 40. The image pickup element 40 is a solid-state image pickup element such as a CMOS sensor or a CCD, and outputs an image signal by receiving the infrared radiation collected by the lens 39. Note that the markers 6R and 6L, located on the periphery of the display screen of the television 2, are infrared LEDs which output infrared light forward from the television 2. Therefore, the infrared filter 38 allows the image pickup element 40 to pick up the image of only the infrared radiation which has passed through the infrared filter 38, and to generate image data. Thus, images of the respective markers 6R and 6L can be more accurately picked up. Hereinafter, an image picked up by the image pickup element 40 is referred to as a "picked up image". The image data generated by the image pickup element 40 is processed by the image processing circuit 41. The image processing circuit 41 calculates positions of objects to be picked up (i.e., the markers 6R and 6L) included in the picked up image. The image processing circuit 41 outputs coordinates representing the calculated positions to the microcomputer 42 of the communication section 36. The microcomputer 42 transmits data representing the coordinates to the game apparatus 3 as the operation data. Hereinafter, the aforementioned coordinates are referred to as "marker coordinates". The marker coordinates vary depending on a direction (posture) or a position of the controller 5, and thus the game apparatus 3 can calculate the direction or the position of the controller 5 by using the marker coordinates.

The acceleration sensor 37 detects acceleration (including gravitational acceleration) of the controller 5. In other words, the acceleration sensor 37 detects force (including gravity) applied to the controller 5. The acceleration sensor 37 detects, from acceleration applied to a detector of the acceleration sensor 37, only a value of acceleration along a straight line (linear acceleration) corresponding to each axis of the acceleration sensor. For example, in the case of a multi-axial acceleration sensor detecting acceleration along two or more axes, a component of acceleration along each of the two or more axes is detected as acceleration applied to the detector of the acceleration sensor 37. For example, a triaxial or biaxial acceleration sensor may be of a type available from Analog Devices, Inc. or STMicroelectronics N.V. The acceleration sensor 37 may be of an electrostatic capacitance (capacitance-coupling) type. However, the acceleration sensor 37 of any other type may be used.

In the present embodiment, the acceleration sensor 37 detects linear acceleration in three directions, i.e., an up-down direction (a Y-axis direction shown in FIG. 3), a left-right direction (the X-axis direction shown in FIG. 3) and a front-rear direction (the Z-axis direction shown in FIG. 3) with respect to the controller 5. Since the acceleration sensor 37 detects acceleration along a straight line corresponding to each of the three axes, the output of the acceleration sensor 37 represents values of linear acceleration along the three respective axes. Specifically, the detected acceleration is represented by a three-dimensional vector (AX, AY, AZ) in a XYZ coordinate system which is set with respect to the controller 5. Hereinafter, a vector having three components as the values of acceleration along the three respective axes detected by the acceleration sensor 37 is referred to as an "acceleration vector".

Data representing acceleration detected by the acceleration sensor 37 (the acceleration data) is outputted to the communication section 36. Note that the acceleration detected by the acceleration sensor 37 varies depending on the direction (posture) or a motion of the controller 5, and thus the game apparatus 3 can calculate the direction or the motion of the controller 5 by using the acceleration data. In the present embodiment, the game apparatus 3 determines the posture of the controller 5 based on the acceleration data.

The data representing the acceleration (the acceleration vector) detected by the acceleration sensor 37 (the acceleration data) is outputted to the communication section 36. In the present embodiment, the acceleration sensor 37 is used as a sensor for outputting data for determining the posture of the controller 5.

Note that through processing by a computer such as a processor of the game apparatus 3 (e.g., the CPU 10) or a processor of the controller 5 (e.g., the microcomputer 42), in accordance with acceleration signals outputted from the acceleration sensor 37, additional information relating to the controller 5 can be inferred or calculated (determined), as one skilled in the art will readily understand from the description herein. For example, in the case where processing is performed by a computer based on the assumption that the controller 5 accommodating the acceleration sensor 37 is in a static state (that is, in the case where it is only gravitational acceleration that is to be detected by the acceleration sensor), it is possible to understand whether or not, or to what extent, the controller is tilted toward the gravity direction in accordance with the detected acceleration as long as the controller is actually in a static state. Specifically, if a state where an axis to be detected by the acceleration sensor is facing a vertically downward direction is set as a reference state, it is possible to find out whether or not the axis to be detected is tilted depending on whether or not 1G (gravitational acceleration) is exerted, and also possible to find out the degree of tilt of the axis to be detected. Further, in the case of the multi-axial acceleration sensor 37, it is possible to find out, in detail, the degree of tilt of respective axes with respect to the gravity direction by processing the acceleration signals along the respective axes. In this case, the processor may calculate data of a tilt angle of the controller 5 in accordance with the output from the acceleration sensor 37, or alternatively infer an approximate tilt angle in accordance with the output from the acceleration sensor 37 without calculating data of the tilt angle. By using the acceleration sensor 37 and the processor in combination with each other in a manner as above described, it is possible to identify the tilt, an posture, and the position of the controller 5.

On the other hand, in the case where it is assumed that the controller 5 is in a dynamic state (that is, in the case where the controller 5 is being moved), the acceleration sensor 37 detects acceleration corresponding to the motion of the controller 5, in addition to gravitational acceleration. Thus, if a component of the gravitational acceleration is removed from the detected acceleration through given processing, it is possible to calculate a motion direction of the controller 5. Even in the case where it is assumed that the controller 5 is in the dynamic state, it is possible to calculate a tilt of the controller 5 toward the gravity direction if a component of the acceleration corresponding to the motion of the acceleration sensor is removed from the detected acceleration through given processing. In another embodiment, the acceleration sensor 37 may include a built-in type signal processing apparatus or a dedicated processing apparatus of any other type so as to perform given processing on the acceleration signal detected by an embedded accelerometer before outputted to the microcomputer 42. For example, in the case where the acceleration sensor 37 is designed to detect static acceleration (e.g., gravitational acceleration), the built-in type or the dedicated processing apparatus may convert the detected acceleration signal into a tilt angle (or any other desirable parameter) corresponding thereto.

In the present embodiment, as the sensor for outputting a value varied in accordance with the motion of the controller 5, an acceleration sensor of an electrostatic capacitance type is used. However, an acceleration sensor or gyro-sensor of any other type may be used. Note that while the acceleration sensor is capable of detecting acceleration along a straight line corresponding to each axis, the gyro-sensor is capable of detecting an angular rate of rotation about each axis. That is, in the case where the acceleration sensor is replaced with the gyro-sensor, characteristics of a signal detected by the gyro-sensor are different from those detected by the acceleration sensor. Thus, the acceleration sensor and the gyro-sensor cannot be easily replaced with each other. In the case where the tilt and the posture are calculated by using the gyro-sensor instead of the acceleration sensor, the following change is performed, for example. Specifically, in the case of using the gyro-sensor, the game apparatus 3 initializes a value of the posture at the time of starting detection. The angular rate data outputted from the gyro-sensor is integrated. Based on an integration result, variation in posture is then calculated from the initialized value of the posture. In this case, the posture to be calculated is represented by the angle.

As already described above, in the case of using the acceleration sensor to calculate the posture, the posture is calculated by using the acceleration vector. Therefore, different from the gyro-sensor, the posture to be calculated can be represented by a vector, and thus an absolute direction can be detected without performing initialization. Further, a type of the value detected as the posture is represented by the angle in the case of using the gyro-sensor, and is represented by the vector, on the other hand, in the case of using the acceleration sensor. Therefore, in the case of using the gyro-sensor instead of the acceleration sensor, the posture data also needs to be converted in an appropriate manner.

The communication section 36 includes the microcomputer 42, a memory 43, the wireless module 44 and the antenna 45. The microcomputer 42 controls the wireless module 44 for wirelessly transmitting data obtained by the microcomputer 42 while using the memory 43 as a storage area at the time of processing.

Data outputted from the operation section 32, the imaging information calculation section 35 and the acceleration sensor 37 to the microcomputer 42 is temporarily stored in the memory 43. The data is then transmitted to the game apparatus 3 as the operation data. Specifically, at a timing of performing a wireless transmission to the wireless controller module 19 of the game apparatus 3, the microcomputer 42 outputs the operation data stored in the memory 43 to the wireless module 19. The wireless module 44 uses, for example, the Bluetooth (registered trademark) technology so as to modulate the operation data by using a carrier wave having a predetermined frequency and to emit the modulated weak radio signal from the antenna 45. That is, the wireless module 44 modulates the operation data into a weak radio signal so as to be transmitted from the controller 5. The weak radio signal is received by the wireless controller module 19 of the game apparatus 3. The game apparatus 3 demodulates or decodes the received weak radio signal to obtain the operation data. In accordance with the obtained operation data and the game program, the CPU 10 of the game apparatus 3 performs the game processing. Wireless transmission from the communication section 36 to the wireless controller module 19 is performed at predetermined time intervals. Since the game processing is generally performed at a cycle of 1/60 sec (one frame period), it is preferable that the wireless transmission needs to be performed at a cycle of a shorter time period. The communication section 36 of the controller 5 outputs the operation data to the wireless controller module 19 of the game apparatus 3 every 1/200 sec, for example.

Figure 7:
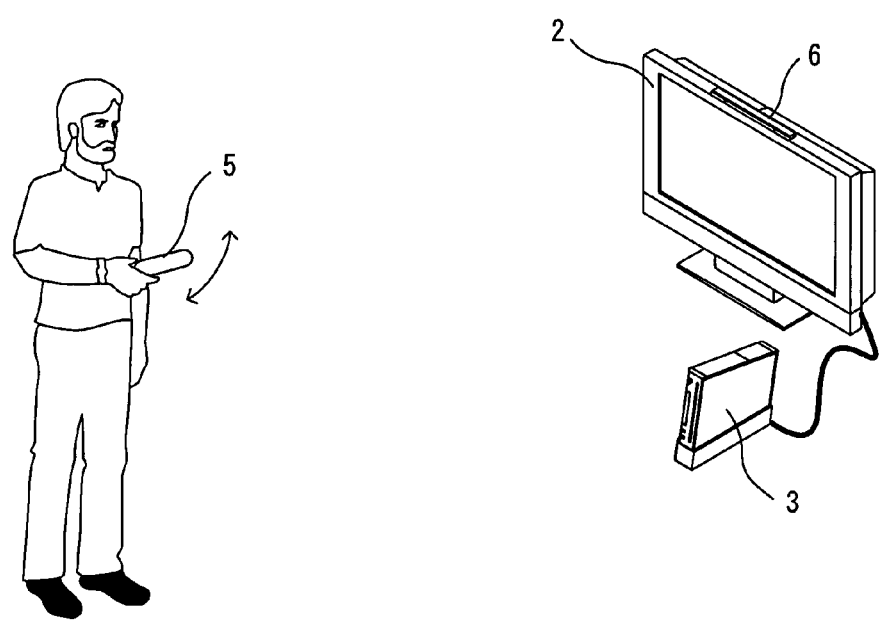
FIG. 7 is a diagram illustrating a state where a game operation is performed using the controller 5.

In addition to a general game operation such as pressing the operation buttons, the controller 5 allows the player to perform an operation of pointing to any position on the screen by means of the controller 5 and to perform an operation of moving the controller 5 itself. FIG. 7 is a diagram illustrating a state where the game operation is performed using the controller 5. In the present embodiment, the player holds the controller 5 such that a top surface thereof (a surface on which the cross button 32a and the like are provided) faces toward a substantially vertically upward direction. Then, as shown in FIG. 7, the player performs the game operation of moving (waving) the controller 5 left and right (in the X-axis direction of the controller 5).

(Outline of Game Processing)

Next, with reference to FIGS. 8 and 9, an outline of the game processing executed by the game apparatus 3 will be described. Hereinafter, the game processing of causing an object disposed in a three-dimensional virtual space (a game space) to perform an action in accordance with the motion of the controller will be mainly described. In the present embodiment, an object to be operated by the player (a player object) is composed of a plurality of parts. Specifically, the player object is composed of a plurality of joints (connection points). In other words, the game apparatus 3 according to the present embodiment causes the player object composed of the plurality of parts to perform an action in accordance with the game operation of moving the controller 5.

Figure 8:
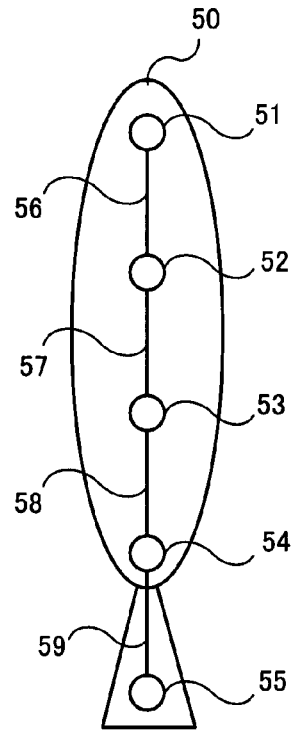
FIG. 8 is a diagram illustrating a configuration of a player object according to the embodiment of the present invention.

FIG. 8 is a diagram illustrating a configuration of the player object to be operated in the present embodiment. As shown in FIG. 8, a player object 50 to be operated in the present embodiment has an appearance simulating a fish. The player object 50 has five joints, i.e., a first joint 51, a second joint 52, a third joint 53, a fourth joint 54 and a fifth joint 55, which are arranged in this order from the front of the player object 50. The joints adjacent to each other are connected to each other by a bone. In the present embodiment, the five joints 51 to 55 are connected to each other so as to be arranged in a line. Specifically, the first joint 51 is connected to the second joint 52 by a first bone 56, the second joint 52 is connected to the third joint 53 by a second bone 57, the third joint 53 is connected to the fourth joint 54 by a third bone 58, and the fourth joint 54 is connected to the fifth joint 55 by a fourth bone 59. In the present embodiment, each of the bones 56 to 59 has a fixed length. Furthermore, a vertex position of a polygon (skin) constituting the player object 50 is determined by a position of each of the joints 51 to 55. That is, a shape of the player object 50 is determined by positional relationships between the joints 51 to 55.

In the present embodiment, as shown in FIG. 8, reference positional relationships between the joints 51 to 55 are obtained when the joints 51 to 55 are connected to each other such that the bones 56 to 59 are arranged in a straight line. As will be described later in detail, when a state where no input is made to the controller 5 continues, the positional relationships between the joints 51 to 55 converge on the reference positional relationships. Furthermore, in the present embodiment, the player object 50 moves on a predetermined plane in a three-dimensional space, and each of the joints 51 to 55 included in the player object 50 moves on the predetermined plane.

In the present embodiment, the player object is composed of the five joints connected to each other so as to be arranged in a line. However, the number of the joints composing the player object may be any other number, and connection relationships between the joints may be any connection relationships.

Figure 9:
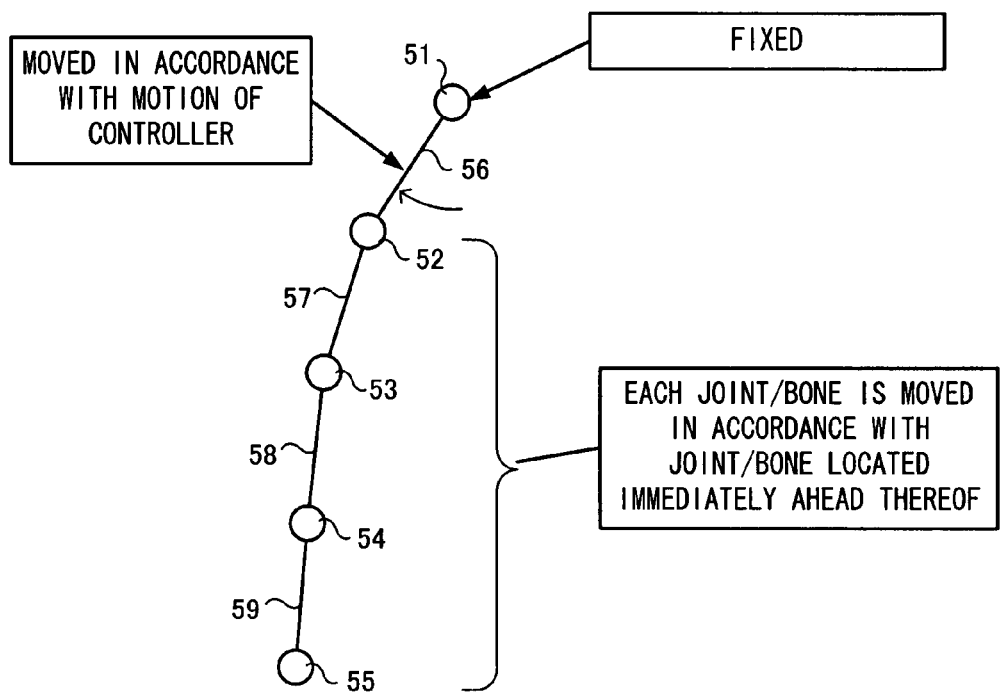
FIG. 9 is a diagram illustrating the player object obtained when an operation is applied to the controller 5.

FIG. 9 is a diagram illustrating the player object obtained when an operation is applied to the controller 5. In the present embodiment, the game apparatus 3 calculates a motion amount indicating the motion of the controller 5 based on an output (acceleration vector) from the acceleration sensor 37. Then, the game apparatus 3 controls an action of the player object 50 by using the motion amount. Note that in the present embodiment, the game apparatus 3 calculates a motion amount by which the controller 5 is moved in the X-axis direction. That is, the game apparatus 3 calculates a motion amount by which the controller 5 is moved left and right. A detailed method of calculating the motion amount will be described later.

As shown in FIG. 9, the game apparatus 3 determines, based on the motion amount, an orientation of the first bone 56, i.e., an orientation of the second joint 52 with respect to the first joint 51. That is, in the present embodiment, the orientation of the first bone 56 is varied in accordance with the controller 5 moving left and right (see an arrow shown in FIG. 9). Furthermore, in the case where the player object 50 is viewed as a reference, the first joint 51 is fixed without being influenced by any input. That is, the motion amount as an input does not exert any influence on a position of the first joint 51.

Hereinafter, a joint in which a position thereof is determined without being influenced by any input to the controller 5, such as the first joint 51, is referred to as a "reference joint". The reference joint is used as a reference for determining orientations of the bones and positions of other joints. In the present embodiment, the first joint 51 which is a front joint is set as the reference joint. However, the reference joint may not necessarily be the front joint. Furthermore, a bone adjacent to the reference joint, such as the first bone 56, is hereinafter referred to as an "adjacent bone". An orientation of the adjacent bone is directly determined in accordance with an input to the controller 5. Still furthermore, a joint adjacent to the reference joint, such as the second joint 52, is referred to as an "adjacent joint". An orientation of the adjacent joint with respect to the reference joint is determined by the input to the controller 5.

As described above, when the orientation of the adjacent bone (the first bone 56) is determined in accordance with the motion of the controller 5, the adjacent joint is accordingly moved based on the orientation of the adjacent bone, and then the other joints are accordingly moved in accordance with the adjacent joint being moved. Specifically, for the joints and bones which are located behind the adjacent bone, a position of each of the joints and an orientation of each of the bones are determined based on a position of a joint located ahead of the each of the joint (i.e., located nearer to the reference joint) and an orientation of a bone located ahead of the each of the bones (i.e., located nearer to the reference joint), respectively. Specifically, when the orientation of the first bone 56 is determined, the game apparatus 3 calculates a position of the second joint 52 based on the position of the first joint 51 and the orientation of the first bone 56. When the position of the second joint 52 is calculated, the game apparatus 3 then calculates an orientation of the second bone 57. Note that an orientation of each of the bones behind the first bone 56 with respect to the reference joint (each of the second to fourth bones 57 to 59) is determined so as to become close to an orientation of a bone located nearer to the reference joint than the each of the bones by one bone. In other words, an orientation of each of the bones located behind the adjacent bone is varied in accordance with an orientation of a bone located nearer to the reference joint than the each of the bones by one bone. For example, the orientation of the second bone 57 is determined so as to become close to that of the first bone 56, i.e., such that the first bone 56 and the second bone 57 are to be arranged nearly in parallel with each other.

As described above, after the position of the second joint 52 and the orientation of the second bone 57 are determined, a position of each of the joints and an orientation of each of the bones, which are located behind the second bone 57 are determined in a similar manner to the second joint 52 and the second bone 57. Specifically, the game apparatus 3 calculates positions of the joints and orientations of the bones sequentially up to the fifth joint 55 which is a rear joint. When a position of the fifth joint 55 is calculated, the positions of all of the joints have been determined, and a posture (shape) of the player object 50 has been determined accordingly. That is, the vertex position of the polygon constituting the player object 50 is determined with respect to each of the positions of the joints 51 to 55.

As described above, in the present embodiment, in accordance with the controller 5 moving (waving) left and right, a front portion of the player object 50 (the first joint 51 and the first bone 56) is waved left and right. A portion behind the front portion is then moved in accordance with the front portion moving left and right. Therefore, in the present embodiment, the player object 50 having the appearance simulating a fish is caused to perform an action so as to be waved (undulated) left and right in accordance with the controller 5 moving left and right, thereby making it possible to realistically express an action in which a fish is swimming. Furthermore, the player can perform an unprecedented game operation of causing a fish to perform an action of swimming by moving the controller 5 left and right.

Furthermore, in the present embodiment, after the posture of the player object 50 is determined, the game apparatus 3 moves the player object 50 in the game space. As will be described later in detail, a position of the player object 50 is calculated based on a movement amount (velocity) of each of the joints. Therefore, in the present embodiment, the input to the controller 5 (i.e., the motion amount) does not directly exert any influence on a movement of the player object 50. Instead, the velocity, of each of the joints, which is determined by an input to the controller 5 exerts an influence on the movement of the player object 50. Note that the input to the controller 5 only exerts an influence on the front portion (a portion of a head of the fish) of the player object 50. Thus, if an input to the controller 5 directly exerted an influence on the movement of the player object 50, it would appear as if the fish moves in accordance with the head waving left and right, thereby making it impossible to naturally express the motion in which the fish is swimming. On the contrary, according to the present embodiment, the input to the controller 5 exerts an influence on the movement of the player object 50 indirectly via the position of each of the joints. Therefore, a motion in which the fish moves in accordance with its body waving left and right can be expressed, thereby making it possible to naturally express the motion in which the fish is swimming.

Furthermore, in the present embodiment, after the posture of the player object 50 is determined, the game apparatus 3 calculates an entire orientation of the player object 50 in the game space. As will be described later in detail, the entire orientation of the player object is determined based on the orientation of the rear bone (the fourth bone 59 in the present embodiment). Note that the input to the controller 5 only exerts an influence on the front portion (a portion of a head of the fish) of the player object 50. Thus, if the input to the controller 5 directly exerted an influence on the orientation of the player object 50, it would appear as if an orientation of the fish varies in accordance with an orientation of the head, thereby making it impossible to naturally express the motion in which the fish is swimming. On the contrary, according to the present embodiment, the input to the controller 5 exerts an influence on the orientation of the player object 50 indirectly via the position of each of the joints and the orientation of each of the bones. Therefore, a motion in which the fish varies an orientation thereof in accordance with its body waving left and right can be expressed, thereby making it possible to naturally express the motion in which the fish is swimming.

(Details of Game Processing)

Figure 10:
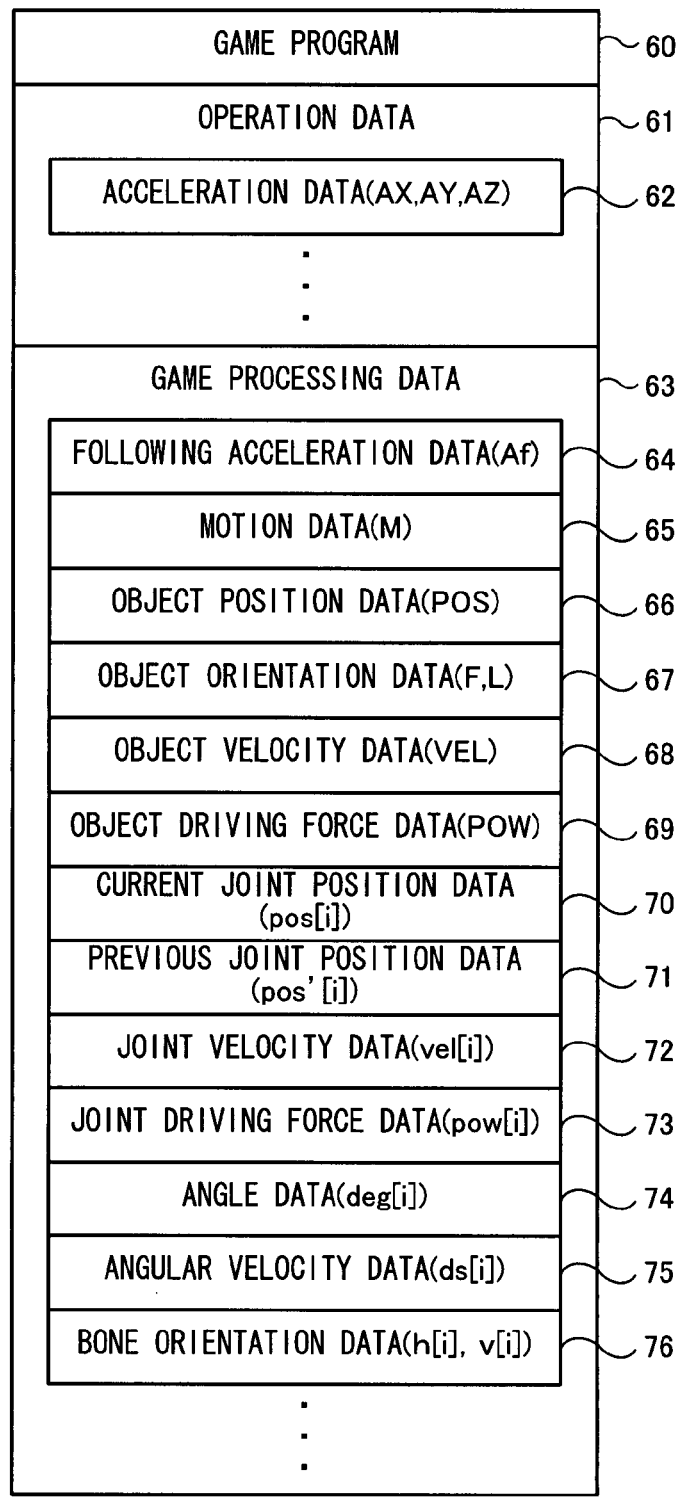
FIG. 10 is a diagram illustrating main data stored in a main memory of the game apparatus 3.
Figure 11:
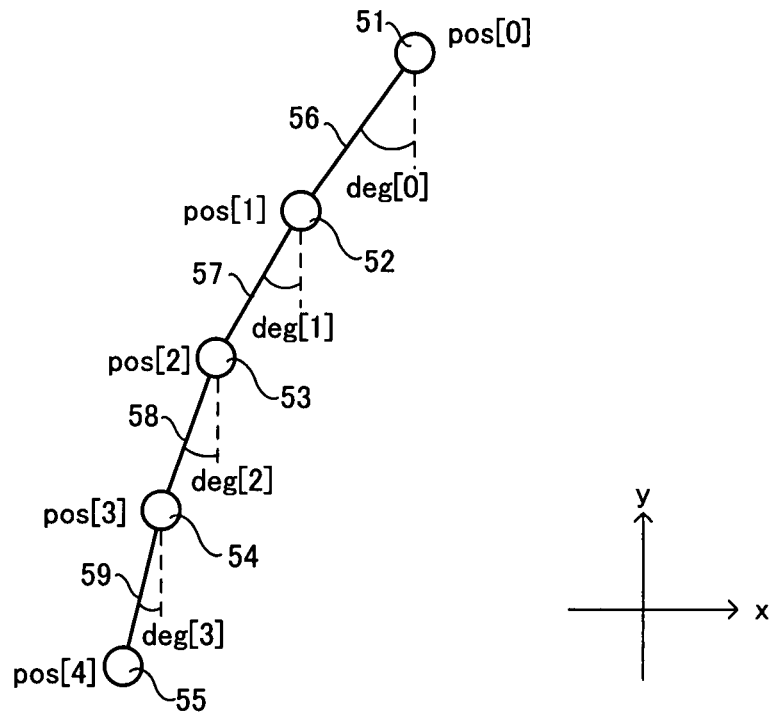
FIG. 11 is a diagram illustrating variables relating to joints and bones of the player object.
Figure 12:
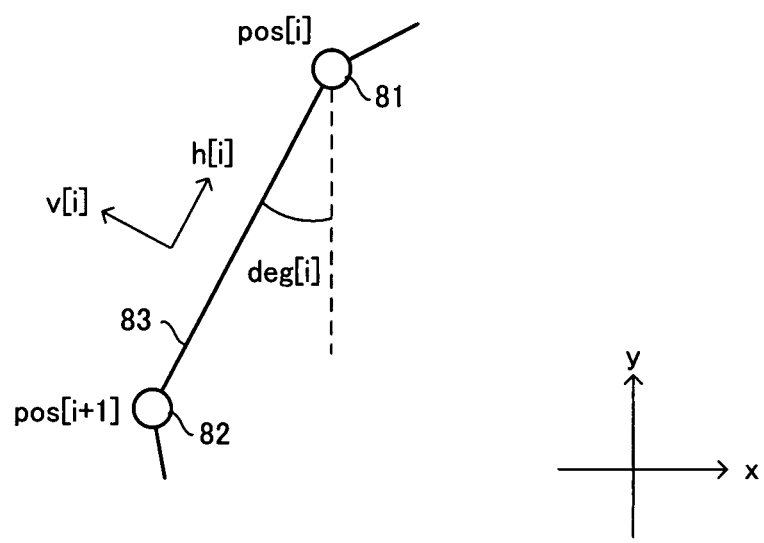
FIG. 12 is a diagram illustrating two vectors representing an orientation of a bone.

Next, the game processing executed by the game apparatus 3 will be described in detail. With reference to FIGS. 10 to 12, main data used for the game processing executed by the game apparatus 3 will be described. FIG. 10 is a diagram illustrating the main data stored in the main memory (the external main memory 12 or the internal main memory 11e) of the game apparatus 3. As shown in FIG. 10, a game program 60, operation data 61 and game processing data 63 are stored in a storage device of the game apparatus 3. Note that in addition to the data shown in FIG. 10, data necessary for the game processing such as image data of various objects appearing in the game, data indicating various parameters of the objects and the like are stored in the main memory.

A portion or an entirety of the game program 60 is loaded from the optical disc 4 at an appropriate timing after the game apparatus 3 is powered on, and the loaded game program is stored in the main memory. The game program 60 includes a program for causing the player object to perform an action in accordance with the motion of the controller 5.

The operation data 61 is the operation data transmitted from the controller 5 to the game apparatus 3. As described above, the operation data is transmitted from the controller 5 to the game apparatus 3 every $1/200$ sec, and thus the operation data stored in the main memory is updated at the same rate. Most recent (most recently received) operation data is only necessary to be stored in the main memory.

The operation data 61 includes acceleration data 62. The acceleration data 62 is data representing acceleration (acceleration vector) detected by the acceleration sensor 37. In the present embodiment, the acceleration data 62 is data representing a three-dimensional acceleration vector A=(AX, AY, AZ) having the three components of acceleration along the three respective axes (X, Y and Z-axes) shown in FIG. 3. Further, in addition to the acceleration data 62, the operation data 61 also includes operation button data representing the input state of each of the operation buttons 32a to 32i, and marker coordinates data representing the marker coordinates.

The game processing data 63 is data used in the game processing (FIG. 13) to be described later. The game processing data 63 includes following acceleration data 64, motion data 65, object position data 66, object orientation data 67, object velocity data 68, object driving force data 69, current joint position data 70, previous joint position data 71, joint velocity data 72, joint driving force data 73, angle data 74, angular velocity data 75, and bone orientation data 76.

The following acceleration data 64 is data representing a value of following acceleration Af. The following acceleration Af is acceleration followed by the acceleration vector detected by the acceleration sensor 37. In other words, the following acceleration indicates a value into which the acceleration detected by the acceleration sensor 37 is smoothed. A detailed method of calculating the following acceleration Af will be described later. In the present embodiment, the following acceleration Af is acceleration followed by an X-axis component AX of the three components included in the acceleration vector A.

The motion data 65 is data representing a value of a motion amount M indicating the motion of the controller 5. Specifically, the motion amount M is calculated by subtracting the following acceleration Af from the X-axis component AX of the acceleration vector A (see formula (2) below).

The object position data 66 represents a value of a position POS of the player object (object position) in the game space. Furthermore, the object position POS is a position at which a predetermined position of the player object is located in the game space. The predetermined position may be the position of the first joint 51 acting as the reference joint, or a center position of the player object, for example.

The object orientation data 67 represents two vectors (a forward direction vector F and a leftward direction vector L) representing an orientation of the player object in the game space. The forward direction vector F is a unit vector representing a direction in which the player object faces forward, and the leftward direction vector L is a unit vector representing a direction in which the player object faces leftward.

The object velocity data 68 represents a velocity VEL of the player object (object velocity), i.e., a value corresponding to the object position POS varied in each unit time period (one frame period). As will be described later in detail, the object velocity VEL is calculated based on an object driving force POW to be described later. In the present embodiment, the object velocity VEL is calculated based on the object driving force POW, and a new object position POS is calculated based on the object velocity VEL.

The object driving force data 69 is data representing a value of a driving force POW of the player object (object driving force). Note that the object driving force POW is a variable for calculating the object velocity VEL, and is calculated based on a driving amount of each of the joints (a joint driving force pow [i] to be described later) of the player object.

In the present embodiment, the player object moves or rotates on the predetermined plane in the three-dimensional game space. Each of the variables of the object position POS, the forward direction vector F, the leftward direction vector F, the object velocity VEL and the object driving force POW is represented by a two-dimensional x' y' coordinate system for representing positions on the predetermined plane. On the other hand, each variable relating to a joint and bone to be described later (a joint position pos, a joint velocity vel, a joint driving force pow, a horizontal direction vector h and a vertical direction vector v) is represented by an x y coordinate system (see FIG. 11) set on the predetermined plane with respect to the player object. The x y coordinate system is set such that a predetermined position of the player object (the object position POS, for example) is an origin point of the x y coordinate system. Furthermore, the x y coordinate system is set so as to be rotated in accordance with the orientation of the player object in the x' y' coordinate system. For example, the x y coordinate system is set such that a y-axis positive direction is a direction in which the player object faces forward, i.e., a direction represented by the vector F.

The current joint position data 70 is data representing a value of a current position of each of the joints of the player object. FIG. 11 is a diagram illustrating variables relating to the joints and bones of the player object. In the present embodiment, as shown in FIG. 11, in the case where the player object has N joints (N=5 in the present embodiment), a position of an i-th joint is denoted by "pos [i]" (i is an integer satisfying 0≦i≦N). Furthermore, a position pos [0] of the first joint, as the reference joint, is a fixed value in the x y coordinate system, and is set to a predetermined value.

The previous joint position data 71 is data representing a previously obtained value of a position pos [i] (i is an integer satisfying 0≦i≦N) of each of the joints (joint position), and is denoted by "pos' [i]". In the present embodiment, the position of each of the joints is updated every one frame period, and thus the previous joint position data 71 represents a value of the joint position pos [i] calculated in a frame immediately preceding a current frame.

The joint velocity data 72 is data representing a value (movement amount) of a velocity vel [i] (i is an integer satisfying 0≦i≦N) of each of the joints (joint velocity). Specifically, the joint velocity vel [i] is calculated by subtracting a previously calculated joint position pos' [i] from a currently calculated joint position pos [i].

The joint driving force data 73 is data representing a value of a driving force pow [i] (i is an integer satisfying 0≦i≦N) generated by the movement of each of the joints (joint driving force). The joint driving force pow [i] is calculated based on the joint velocity vel [i]. Also, the joint driving force pow [i] is used for calculating the object driving force POW.

The angle data 74 is data of a value representing an orientation (angle) of each of the bones (bone orientation (angle)) deg [i] (i is an integer satisfying 0≦i≦N) of the player object. As shown in FIG. 11, the bone angle deg [i] (by degrees) of an i-th bone is represented as an angle formed by a predetermined direction determined with respect to the player object (in the present embodiment, a y-axis negative direction in the x y coordinate system) and an orientation toward an (i+1)th joint from the i-th joint. In the present embodiment, the bone angle deg [i] is within a range satisfying −180°≦deg[i]<180°. When a bone is located at a position rotated clockwise from the y-axis negative direction, the bone angle deg [i] is a positive value. On the other hand, when the bone is located at a position rotated counterclockwise from the y-axis negative direction, the bone angle deg [i] is a negative value. Therefore, in the case where the player object is viewed from rear to front, when a bone is tilted to the left with respect to the y-axis, the bone angle deg [i] is a positive value. On the other hand, when the bone is tilted to the right with respect to the y-axis, the bone angle deg [i] is a negative value.

The angular velocity data 75 is data representing a value of a varied amount of an orientation ds [i] (i is an integer satisfying 0≦i≦N) of each of the bones (bone angular velocity). The bone angular velocity ds [i] is used for calculating a new angle based on a previously calculated angle.

The bone orientation data 76 is data representing values of two vectors (a horizontal direction vector h [i] and a vertical direction vector v [i]) representing the orientation of each of the bones of the player object. FIG. 12 is a diagram illustrating the two vectors representing the orientation of each of the bones. As shown in FIG. 12, the horizontal direction vector h [i] is a unit vector representing a direction, parallel to an i-th bone 83. The vertical direction vector v [i] is a unit vector representing a direction, perpendicular to the i-th bone 83. More specifically, the horizontal direction vector h [i] is oriented toward an i-th joint 81 from an (i+1)th joint 82, and the vertical direction vector v [i] is obtained by rotating the horizontal direction vector h [i] counterclockwise by 90 degrees.

Figure 13:
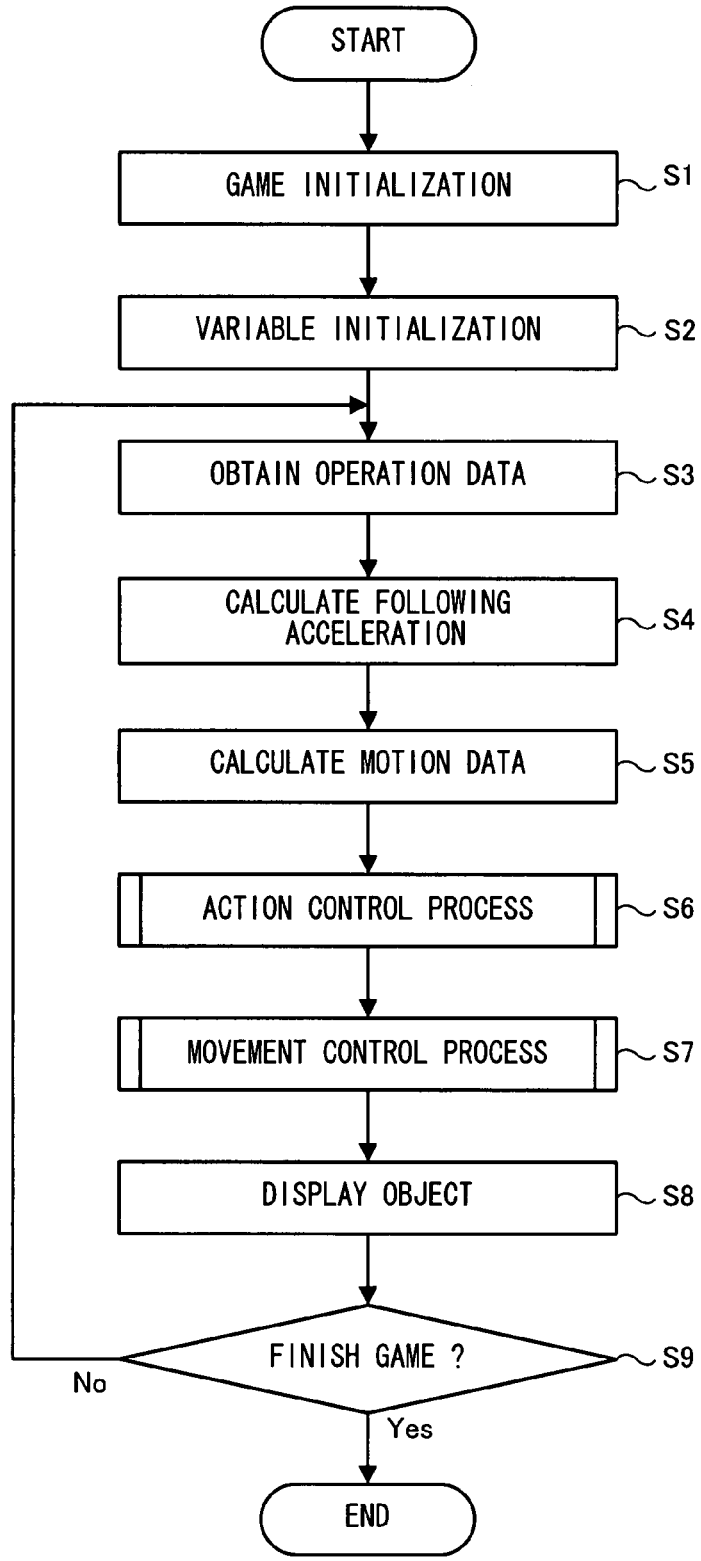
FIG. 13 is a main flowchart illustrating a flow of a game processing executed in the game apparatus 3.

Next, with reference to FIGS. 13 to 15, the game processing executed by the game apparatus 3 will be described in detail. FIG. 13 is a main flowchart illustrating a flow of the game processing executed by the game apparatus 3. When the game apparatus 3 is powered on, the CPU 10 of the game apparatus 3 executes a boot program stored in a boot ROM not shown so as to initialize each unit such as the main memory. The game program stored on the optical disc 4 is loaded to the main memory and the CPU 10 starts to execute the game program. The flowchart of FIG. 13 shows the game processing performed after these processes are completed.

Firstly, in step S1, an initialization process of the game is executed. Specifically, in the initialization process, a virtual three-dimensional game space is established, and a process of disposing the player object and other objects at initial positions in the game space and the like are executed. Therefore, data representing the initial positions is stored in the main memory as the object position data 66, and data representing a predetermined initial orientation is also stored in the main memory as the object orientation data 67. In an initial state, the player object is stationary. Therefore, data represented as "(0, 0)" is stored in the main memory as the object velocity data 68. During the initialization process in step S1, in addition to the aforementioned processes, a process of setting a position and direction of a virtual camera for generating an image of the game space to be in predetermined initial states and the like are executed.

In step S2, each of the values of variables used in the game processing to be executed hereafter is initialized. Specifically, the CPU 10 sets a content of each of the following acceleration data 64, the motion data 65, the current joint position data 70, the joint velocity data 72, the joint driving force data 73, the angle data 74, and the angular velocity data 75 in a manner as described below, and stores the content of each of the aforementioned data in the main memory. More specifically, the content of the following acceleration data 64 is set such that "the following acceleration Af=0" is satisfied. The content of the motion data 65 is set such that "the motion amount M=0" is satisfied. The content of the current joint position data 70 is set such that the joint position pos [i] is represented as "(0, 0)". The content of the joint velocity data 72 is set such that the joint velocity vel [i] is represented as "(0, 0)". The content of the joint driving force data 73 is set such that the joint driving force pow [i] is represented as "(0, 0)". The content of the angle data 74 is set such that the bone angle deg [i] is represented as "0". The content of the angular velocity data 75 is set such that the bone angular velocity ds [i] is represented as "0".

After step S2, a process loop from steps S3 to S9 is repeatedly executed while the game is executed. Note that the process loop is executed at a cycle of one frame period (1/60 sec, for example).

In step S3, the CPU 10 obtains the operation data. Specifically, the operation data transmitted from the controller 5 is received via the wireless controller module 19, and the acceleration data included in the operation data is stored in the main memory. Thus, the CPU 10 reads the acceleration data 62 from the main memory. In the process loop from steps S3 to S9, step S3 is repeatedly executed, thereby repeatedly obtaining a value (acceleration vector) varied in accordance with the motion of the controller 5.

In step S4, the CPU 10 calculates the following acceleration Af based on the acceleration vector A. In the present embodiment, the CPU 10 calculates the following acceleration Af by using the X-axis component AX of the acceleration vector A represented by the acceleration data 62 obtained in step S3 and a previously calculated following acceleration Af'. Note that the previously calculated following acceleration Af' is represented by the following acceleration data 64 stored in the main memory at a time immediately before executing step S4. Specifically, the following acceleration Af is calculated in accordance with the following formula (1).

$$Af=Af'+(AX-Af')\times K1 \quad (1)$$

In the above formula (1), a constant K1 is previously defined within a range satisfying 0<K1<1. In the present embodiment, the constant K1 is set so as to satisfy K1=0.03, for example. Data representing the following acceleration Af calculated in step S4 is stored in the main memory as the following acceleration data 64.

In step S5, the CPU 10 calculates the motion amount M based on the following acceleration Af. The motion amount M is calculated by using the acceleration data 62 and the following acceleration data 64 stored in the main memory. Specifically, the motion amount M is calculated in accordance with the following formula (2).

$$M=AX-Af \quad (2)$$

Data representing the motion amount M calculated in step S5 is stored in the main memory as the motion data 65.

As described above, in the present embodiment, instead of directly using a value of acceleration (acceleration vector) detected by the acceleration sensor 37, the motion amount M calculated by subtracting, from the value of the acceleration detected by the acceleration sensor 37, a value of the following acceleration followed by the acceleration detected by the acceleration sensor 37, is used as an input. In another embodiment, the value of the acceleration detected by the acceleration sensor 37 may be directly used as an input instead of the motion amount M.

Note that the acceleration detected by the acceleration sensor 37 includes a component resulting from gravity (a gravitational acceleration component) and a component resulting from an inertial force generated by the controller 5 being moved. In the present embodiment, the controller 5 is used being waved in a state where the tilt of the controller 5 almost remains unchanged. In such a case, it may be assumed that although the gravitational acceleration component does not rapidly change, the component resulting from the inertial force rapidly changes. The following acceleration is acceleration from which a high frequency component (a component which changes rapidly) is removed by smoothing the acceleration detected by the acceleration sensor 37, and thus the following acceleration corresponds to the gravitational acceleration component of the two above-described components. Therefore, by subtracting the following acceleration from the acceleration detected by the acceleration sensor 37, the component resulting from the inertial force, i.e., a component resulting from the motion of the controller 5, can be extracted based on the two components included in the acceleration detected by the acceleration sensor 37. Thus, in the present embodiment using the motion amount M, the motion of the controller 5 can be more accurately calculated as compared to when directly using the acceleration detected by the acceleration sensor 37, thereby making it possible to allow an operation of moving the controller 5 to more accurately exert an influence on the action of the player object.

In the present embodiment, assuming that the controller 5 is held in a state where the button surface thereof faces a substantially vertically upward direction, a motion of the controller 5 in a horizontal direction is calculated. Therefore, only the X-axis component of the acceleration vector is used to calculate the motion amount M. Alternatively, when it is assumed that the controller 5 is held in a state of being rotated about the Z-axis (e.g., the controller 5 is held in a state where the button surface thereof faces the horizontal direction), the motion of the controller 5 in the horizontal direction may also be calculated. Specifically, in step S4, the CPU 10 calculates the following acceleration followed by the X-axis component and a Y-axis component, respectively, of the acceleration vector. Then, in step S5, motion amounts are respectively calculated by using the X-axis component and the Y-axis component, thereby calculating a two-dimensional vector having two components representing the motion amounts obtained by using the X-axis component and the Y-axis component, respectively. Furthermore, the CPU 10 calculates an angle formed by the Y-axis negative direction and the gravity direction, and converts the two-dimensional vector into another two-dimensional vector rotated by the angle. Note that the gravity direction is represented by a following acceleration vector having two components representing the following acceleration followed by the X-axis component and the Y-axis component of the acceleration vector, respectively. Therefore, the aforementioned angle is calculated as an angle formed by the Y-axis negative direction and the following acceleration vector. Since an X-axis component of the converted two-dimensional vector represents the motion of the controller 5 in the horizontal direction, the CPU 10 uses a value of the X-axis component instead of the motion amount used in the present embodiment. As such, even when the controller 5 is held in a state of being rotated about the Z-axis, the motion of the controller 5 in the horizontal direction can be calculated.

In step S6, the CPU 10 executes an action control process. The action control process is a process of causing the player object to perform an action in accordance with the motion of the controller 5 (the motion amount M). With reference to FIG. 14, the action control process will be hereinafter described in detail.

Figure 14:
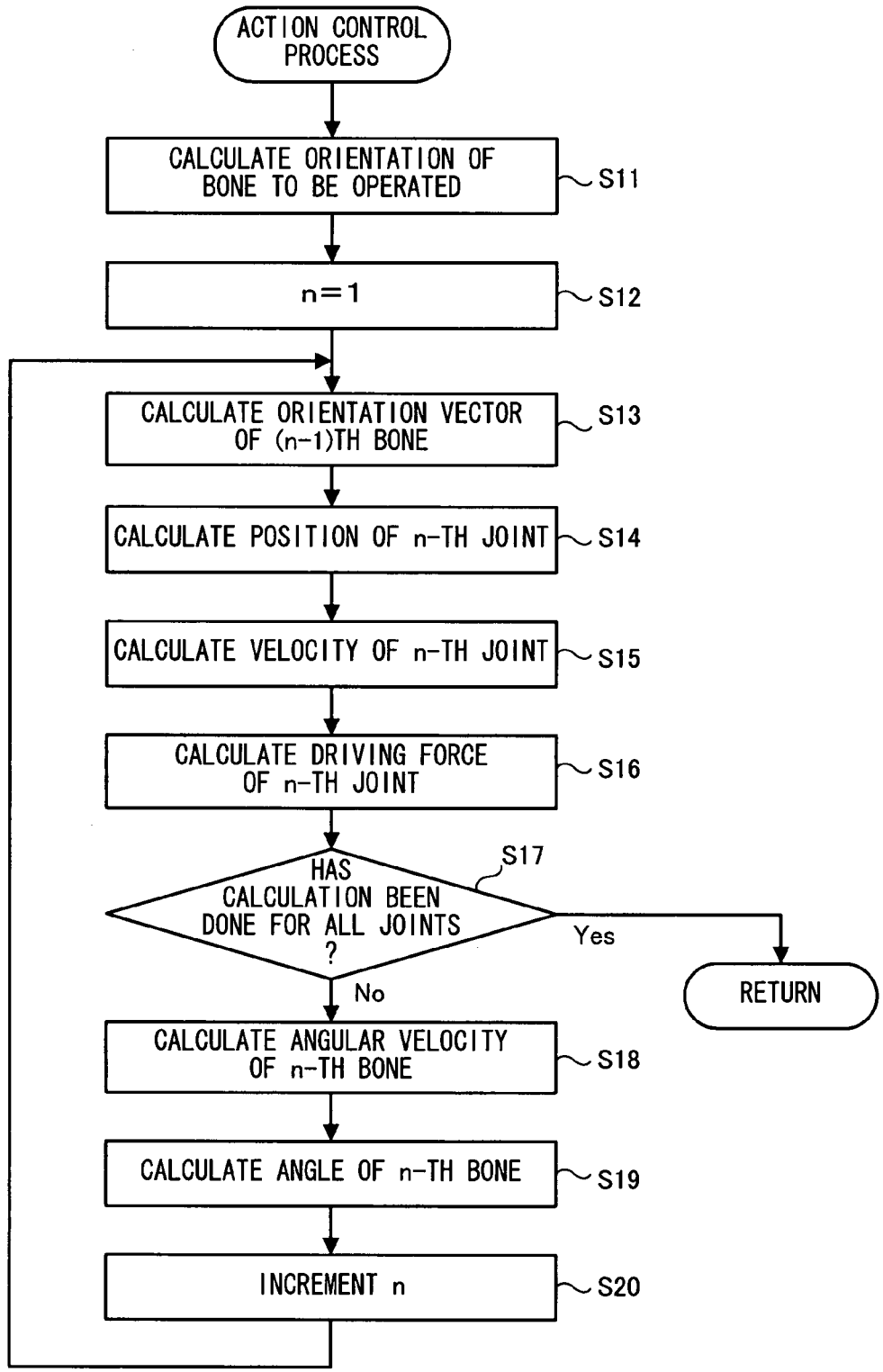
FIG. 14 is a flowchart illustrating a flow of an action control process (step S6) shown in FIG. 13.

FIG. 14 is a flowchart illustrating a flow of the action control process (step S6) shown in FIG. 13. In the action control process, the CPU 10 calculates, in step S11, the orientation of the adjacent bone (the first bone 56 in the present embodiment) connected to the reference joint. As described above, the bone angle deg [0] of the adjacent bone is calculated based on the motion amount M as an input to the controller 5. Note that the motion amount M is stored in the main memory as the motion data 65. Specifically, the CPU 10 calculates the bone angle deg [0] of the adjacent bone in accordance with the following formula (3).

$$\deg[0] = M \times S1 \tag{3}$$

In the above formula (3), a constant S1 is previously defined. In the present embodiment, the constant S1 is set so as to satisfy S1=8.6, for example. In step S11, among the angle data 74 stored in the main memory, data representing the bone angle deg [0] of the adjacent bone is updated to a value newly calculated in step S11.

As shown in the above formula (3), in the present embodiment, the bone angle deg [0] of the adjacent bone is in proportion to the motion amount M. Therefore, in the present embodiment, whether the orientation of the adjacent bone is tilted to the left or right with respect to a reference orientation (a orientation satisfying deg [0]=0°) (i.e., whether deg [0] is a positive or negative value) is determined depending on whether the controller 5 is moved to the left or right (i.e., whether the motion amount M is a positive or negative value). Therefore, the adjacent bone is moved left and right in accordance with the controller 5 moving (waving) left and right.

In step S12, the CPU 10 sets a value of a counter n so as to satisfy n=1. Data representing the value of the counter n is stored in the main memory. Note that n is a variable indicating a number of a joint or bone to be processed.

After step S12, a process loop from steps S13 to S20 is repeatedly executed. In the process loop from steps S13 to S20, for the joints and bones which are located behind the adjacent bone (the first bone 56) with respect to the reference joint, a position of each of the joints and an orientation of each of the bones are calculated.

In steps S13 to S16 to be described below, as well as the position of each of the joints other than the reference joint, the velocity and driving force thereof are calculated. Hereinafter, in steps S13 to S16, a joint for which a position, velocity and driving force thereof are calculated is referred to as a "processing target joint". The processing target joint is a joint designated by the value of the counter n, i.e., an n-th joint.

In step S13, the CPU 10 calculates two vectors h [n−1] and v [n−1] representing an orientation of a bone connected to the processing target joint and located nearer to the reference joint than the processing target joint by one bone, (i.e., an (n−1)th bone). These two vectors h [n−1] and v [n−1] are calculated based on a bone angle deg [n−1] of the (n−1)th bone. Specifically, the horizontal direction vector h [n−1] (=(hx [n−1], hy [n−1])) and the vertical direction vector v [n−1] (=(vx [n−1], vy [n−1])) are calculated in accordance with the following formula (4).

$$hx[n-1] = \sin(\deg[n-1])$$

$$hy[n-1] = \cos(\deg[n-1])$$

$$vx[n-1] = -\cos(\deg[n-1])$$

$$vy[n-1] = \sin(\deg[n-1]) \tag{4}$$

In step S13, among the bone orientation data 76 stored in the main memory, data representing the horizontal direction vector and the vertical direction vector of the (n−1)th bone is updated to a value newly calculated in step S13.

In step S14, the CPU 10 calculates a position of the processing target joint. A joint position pos [n] of the processing target joint is calculated based on a horizontal direction vector h [n−1] and a vertical direction vector v [n−1] of the orientation of the (n−1)th bone and a joint position pos [n−1] of the (n−1)th joint. Specifically, the CPU 10 reads the current joint position data 70 and the bone orientation data 76 stored in the main memory, thereby calculating the joint position pos [n] (=(posx [n], posy [n])) of the processing target joint in accordance with the following formula (5).

$$\text{pos}x[n] = \text{pos}x[n-1] - hx \times L$$

$$\text{pos}y[n] = \text{pos}y[n-1] - hy \times L \tag{5}$$

In the above formula (5), a constant L indicates a length of each bone, and is previously defined. In the present embodiment, the constant L is set so as to satisfy L=10, for example. In step S14, among the current joint position data 70 stored in the main memory, data representing the position of the n-th joint is updated to a value newly calculated in step S14. Furthermore, the data representing a position of the n-th joint calculated before being updated is stored in the main memory as the data representing the position of the n-th joint among the previous joint position data 71.

In step S15, the CPU 10 calculates a joint velocity vel [n] of the processing target joint. The joint velocity vel [n] is calculated based on the joint position pos [n] of the processing target joint, which is calculated in the current frame and a joint position pos' [n] of the processing target joint, which is calculated in the frame immediately preceding the current frame. Specifically, the CPU 10 reads the current joint position data 70 and the previous joint position data 71 stored in the main memory, thereby calculating the joint velocity vel [n] (=(velx [n], vely [n])) of the processing target joint in accordance with the following formula (6).

$$\text{vel}x[n] = \text{pos}x[n] - \text{pos}x'[n]$$

$$\text{vel}y[n] = \text{pos}y[n] - \text{pos}y'[n] \tag{6}$$

In the above formula (6), a variable posx' [n] is an x-axis coordinate value representing the position of the n-th joint calculated in the frame preceding the current frame, and a variable posy' [n] is a y-axis coordinate value representing the position of the n-th joint calculated in the frame preceding the current frame. In step S15, among the joint velocity data 72 stored in the main memory, data representing the velocity of the n-th joint is updated to a value newly calculated in step S15.

In step S16, the CPU 10 calculates a joint driving force pow [n] of the processing target joint based on the joint velocity vel [n] of the processing target joint. Specifically, the CPU 10 reads the joint velocity data 72 stored in the main memory, thereby calculating the joint driving force pow [n] (=(powx [n], powy [n])) of the processing target joint in accordance with the following formula (7).

$$\text{pow}x[n] = vx[n] \times (-vx[n] \times \text{vel}x[n] - vy[n] \times \text{vel}y[n])$$

$$\text{pow}y[n] = vy[n] \times (-vx[n] \times \text{vel}x[n] - vy[n] \times \text{vel}y[n]) \tag{7}$$

In step S16, among the joint driving force data 73 stored in the main memory, data representing the driving force of the n-th joint is updated to a value newly calculated in step S16.

As is clear from the above formula (7), the joint driving force pow [n] is calculated as a value of a component, of an opposite direction to the vertical direction vector v, included in the joint velocity vel [n] of the processing target joint. Note that a direction of the joint driving force is calculated so as to be opposite to that of the velocity of the processing target joint. This is because in the present embodiment where an action of a fish swimming in the water is expressed, a driving force is applied in an opposite direction to that in which a joint is moved, and thus it is natural that the object is moved in an opposite direction to that in which the joint is moved. In another embodiment, the joint driving force may be calculated based on the joint velocity. For example, the joint driving force may be calculated by multiplying the joint velocity by a predetermined constant.

In step S17, the CPU 10 determines whether or not a process from steps S13 to S16 has been executed for all of the joints included in the player object. This determination can be made whether or not the value of the counter n equals to the number of the joints N. As a result of step S17, when it is determined that the aforementioned process has been executed for all of the joints, the CPU 10 finishes the action control process. On the other hand, when it is determined that the aforementioned process has not yet been executed for all of the joints, a process from steps S18 to S20 is executed.

A process from steps S18 to S19 is a process of calculating an orientation of a bone located behind and connected to a joint which was acted as the processing target joint in the most recently executed process from steps S13 to S16. Hereinafter, a bone for which an orientation thereof is calculated in the process from steps S18 and S19 is referred to as a "processing target bone". The processing target bone is a bone designated by the value of the counter n, i.e., an n-th bone.

In step S18, the CPU 10 calculates a bone angular velocity ds [n] of the processing target bone. The bone angular velocity ds [n] is calculated based on a bone angle deg' [n] and bone angular velocity ds' [n] which are calculated in the frame immediately preceding the current frame, and a bone angle deg [n−1] of an (n−1)th bone located immediately ahead of the processing target bone. Specifically, the CPU 10 reads the angle data 74 and the angular velocity data 75 stored in the main memory, thereby calculating the bone angular velocity ds [n] of the processing target bone in accordance with the following formula (8).

$$ds[n]=ds'[n]\times D-(\deg[n]-\deg[n-1])\times K2 \qquad (8)$$

In the above formula (8), a constant D is previously defined within a range satisfying 0<D<1. In the present embodiment, the constant D is set so as to satisfy D=0.9, for example. Also, a constant K2 is previously defined within a range satisfying 0<K2<1. In the present embodiment, the constant K2 is set so as to satisfy K2=0.02, for example. In step S18, among the angular velocity data 75 stored in the main memory, data representing the angular velocity of the n-th bone is updated to a value newly calculated in step S18.

As is clear from the above formula (8), in step S18, a new bone angular velocity ds [n] is calculated such that the bone angular velocity ds' [n] obtained in the frame immediately preceding the current frame is attenuated, and the angle of the processing target bone becomes close to that of a bone located immediately ahead of the processing target bone. Therefore, each of the bones included in the player object is moved in accordance with a motion of a bone located immediately ahead of the each of the bones, and if a state where the motion of the bone located immediately ahead of each of the bones is stopped continues, a motion of the each of the bones is to be stopped accordingly at a time after a certain time period has passed. In other words, if a state where no input is made to the controller 5 and a motion of the adjacent bone (the front bone) is stopped continues, the positional relationships between the joints converge on the reference positional relationships mentioned above. Note that a time period required until the aforementioned positional relationships converge on the reference positional relationships varies depending on values of the constant D and the constant K2.

In step S19, the CPU 10 calculates a bone orientation (angle) deg [n] of the processing target bone based on the bone angular velocity ds [n] of the processing target bone. Specifically, the CPU 10 reads the angle data 74 and the angular velocity data 75 stored in the main memory, thereby calculating the bone angle deg [n] of the processing target bone in accordance with the following formula (9).

$$\deg[n]=\deg'[n]+ds[n] \qquad (9)$$

In the above formula (9), a variable deg' [n] is, similarly to ds' [n] in the above formula (8), the angle of the processing target bone calculated in the frame immediately preceding the current frame. When step S19 is executed, the variable is stored in the main memory as the angle data 74. In step S19, among the angle data 74 stored in the main memory, data representing the angle of the n-th bone is updated to a value newly calculated in step S19.

In step S20, the CPU 10 increments the value of the counter n (by 1). After step S20, the process loop from steps S13 to S20 is executed again. Therefore, in a process from step S13 to S16 to be subsequently executed, a joint located immediately behind another joint on which the process is currently executed (i.e., the processing target joint) is to be processed. Also, in the process from steps S18 to S19 to be subsequently executed, a bone located immediately behind another bone on which the process is currently executed (i.e., the processing target bone) is to be processed. Thus, the process loop from steps S13 to S20 is repeatedly executed, thereby sequentially calculating, for the joints and bones located behind the adjacent bone, the positions of the joints and the orientations of the bones in an order from the nearest to the furthest joint and bone from the front end.

According to the action control process described above, in step S11, the angle of the adjacent bone (i.e., the orientation of the adjacent joint with respect to the reference joint) is determined based on the motion amount. By initially executing a subsequent process from steps S13 to S14, the position of the adjacent joint connected to the adjacent bone is determined. After the process from steps S13 to S14 is initially executed, the process from steps S18 to S19 and the process from steps S13 to S14 (to be executed thereafter) are repeatedly executed, thereby calculating positions to be moved for the joints other than the reference joint and the adjacent joint in an order from the nearest to the furthest joint from the reference joint. Specifically, for the joints and bones located behind the adjacent joint, the positions of the joints and the orientations of the bones are sequentially determined. Finally, in step S17 after the process from steps S13 to S14 is repeatedly executed N times, it is determined that the process from steps S13 to S16 has been executed for all of the joints, and then the action control process is to be finished. Accordingly, all of the positions of N joints and the orientations of N−1 bones have been determined, and thus the shape of the player object also has been determined. Furthermore, in the present embodiment, in a process from steps S15 to S16, a driving force is calculated for each of the joints other than the reference joint. In a movement control process in step S7 to be described later, the player object is moved in the game space based on the driving force.

Referring back to FIG. 13, in step S7 subsequent to step S6, the CPU 10 executes the movement control process. The movement control process is a process of moving the player object in the game space. With reference to FIG. 15, the movement control process will be hereinafter described in detail.

Figure 15:
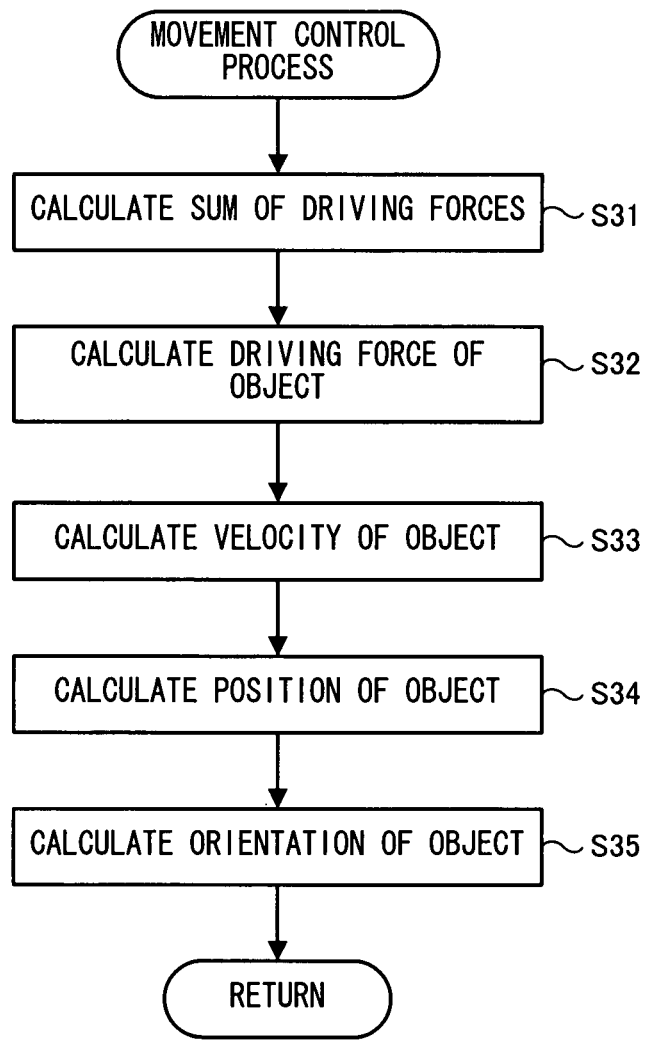
FIG. 15 is a flowchart illustrating a flow of a movement control process (step S7) shown in FIG. 13.

FIG. 15 is a flowchart illustrating a flow of the movement control process (step S7) shown in FIG. 13. In the movement control process, in steps S31 and S32, the object driving force POW is calculated based on the joint driving force pow [i] (i is an integer from 1 to N). In other words, in step S31, the CPU 10 firstly calculates a sum of joint driving forces of the respective joints. Specifically, the CPU 10 reads the joint driving force data 73 stored in the main memory, thereby calculating a sum of N joint driving forces of the respective joints. Similarly to the joint driving force, the sum calculated in steps S31 is represented by a two-dimensional vector in the x y coordinate system, and the vector may be represented as (sumx, sumy).

In step S32, the CPU 10 calculates the object driving force POW based on the sum calculated in step S31. Specifically, the CPU 10 converts the sum (sumx, sumy) in the x y coordinate system set with respect to the player object into a two-dimensional vector in the x' y' coordinate system set with respect to the game space, thereby calculating the object driving force POW. Note that the x y coordinate system is set such that the y-axis positive direction is the direction represented by the vector F in the x' y' coordinate system. Therefore, the CPU 10 calculates the object driving force POW (=(POWx, POWy)) in accordance with the following formula (10).

$$POWx = -Lx \times sumx + Fx \times sumy$$

$$POWy = -Ly \times sumx + Fy \times sumy \quad (10)$$

In the above formula (10), variables Lx and Ly are an x'-axis component and a y'-axis component of the leftward direction vector L, respectively. Similarly, variables Fx and Fy are an x'-axis component and a y'-axis component of the forward direction vector F, respectively. Data representing the object driving force POW calculated by the above formula (10) is stored in the main memory as the object driving force data 69.

In step S33, the CPU 10 calculates the object velocity VEL. The object velocity VEL is calculated based on an object velocity VEL' calculated in the frame immediately preceding the current frame and the object driving force POW. Specifically, the CPU 10 reads the object velocity data 68 and the object driving force data 69 stored in the main memory, thereby calculating the object velocity VEL (=(VELx, VELy)) in accordance with the following formula (11).

$$VELx = VELx' \times R + POWx \times S2$$

$$VELy = VELy' \times R + POWy \times S2 \quad (11)$$

In the above formula (11), a constant R is previously defined within a range satisfying 0<R<1. In the present embodiment, the constant R is set so as to satisfy R=0.995, for example. Similarly, a constant S2 is previously defined. In the present embodiment, the constant S2 is set so as to satisfy S2=0.01, for example. Furthermore, variables VELx' and VELy' are an x'-axis component and a y'-axis component of the object velocity, respectively, calculated in the frame immediately preceding the current frame. When step S33 is executed, the variables VELx' and VELy' are stored in the main memory as the object velocity data 68. Data representing the object velocity VEL calculated by the above formula (11) is stored in the main memory as the object velocity data 68.

As is clear from the above formula (11), in step S33, the object velocity VEL of the current frame is calculated such that the object velocity VEL' of the frame immediately preceding the current frame is attenuated, and to the attenuated object velocity VEL', a value obtained by applying a predetermined weight to the object driving force POW calculated in the current frame is added. Thus, the object velocity VEL is varied in accordance with the joint velocity vel [i].

In step S34, the CPU 10 calculates the object position POS of the player object based on the object velocity VEL. Specifically, the CPU 10 reads the object position data 66 and the object velocity data 68 stored in the main memory, thereby calculating the object position POS (=(POSx, POSy)) in accordance with the following formula (12).

$$POSx = POSx' + VELx$$

$$POSy = POSy' + VELy \quad (12)$$

In the above formula (12), variables POSx' and POSy' are an x'-axis component and a y'-axis component of the object position, respectively, calculated in the frame immediately preceding the current frame. When step S34 is executed, the variables POSx' and POSy' are stored in the main memory as the object position data 66. Data representing the object position POS calculated by the above formula (12) is stored in the main memory as the object position data 66. By executing step S34, the player object is moved based on the velocity of each of the joints.

In step S35, the CPU 10 calculates the orientation of the player object. As described above, the orientation of the player object is determined based on a bone angle deg [N−1] of the rear bone. Specifically, the CPU 10 reads the angle data 74 stored in the main memory, thereby calculating the forward direction vector F (=(Fx, Fy)) in accordance with the following formula (13).

$$Fx = Fx' - Lx' \times deg[N-1] \times S3$$

$$Fy = Fy' - Ly' \times deg[N-1] \times S3 \quad (13)$$

In the above formula (13), a constant S3 is previously defined. In the present embodiment, the constant S3 is set so as to satisfy S3=0.02, for example. Variables Fx' and Fy' are an x'-axis component and a y'-axis component of the forward direction vector F, respectively, calculated in the frame immediately preceding the current frame. When step S35 is executed, the variables Fx' and Fy' are stored in the main memory as the object orientation data 67. Similarly, variables Lx' and Ly' are an x'-axis component and a y'-axis component of the leftward direction vector L, respectively, calculated in the frame immediately preceding the current frame. When step S35 is executed, the variables Lx' and Ly' are stored in the main memory as the object orientation data 67. According to the above formula (13), in the case where the player object is viewed from rear to front, when the rear bone is tilted counterclockwise with respect to the y-axis (when deg [N−1]>0 is satisfied), the player object is to be rotated clockwise. On the other hand, when the rear bone is tilted clockwise with respect to the y-axis (when deg [N−1]<0 is satisfied), the player object is to be rotated counterclockwise. When the y-axis coincides with the orientation of the rear bone (when deg [N−1]=0 is satisfied), the player object is not to be rotated. That is, according to the above formula (13), the orientation of the player object is varied such that the orientation of the player object coincides with the orientation of the rear bone.

After calculating the above formula (13), the CPU 10 normalizes a magnitude of the forward direction vector F thus obtained, and sets the forward direction vector F as a unit vector. Furthermore, the leftward direction vector L is calculated based on the forward direction vector F which is set as the unit vector. Specifically, the CPU 10 calculates the leftward direction vector L (=(Lx, Ly)) in accordance with the following formula (14).

$$Lx=-Fy$$

$$Ly=Fx \qquad (14)$$

Data representing the forward direction vector F and the leftward direction vector L calculated in the above process is stored in the main memory as the object orientation data 67. After step S35, the CPU 10 finishes the movement control process.

Referring back to FIG. 13, in step S8 subsequent to step S7, the CPU 10 generates an image of the game space including the player object and displays the generated image. That is, the polygon constituting the player object is formed based on a position of each of the joints, which is represented by the current joint position data 70 stored in the main memory, and disposed in the game space at a position represented by the object position data 66 so as to face a direction represented by the object orientation data 67. The CPU 10 and the GPU 11*b* generate an image obtained when the game space, in which the player object is disposed as described above, is viewed from a virtual camera, and display the generated image on the screen of the television 2.

In step S9, the CPU 10 determines whether or not the game is to be finished. The determination in step S9 is made based on, for example, whether the game is cleared or not, whether the game is over or not, whether the player issues an instruction to stop the game or not and the like. As a result of step S9, when it is determined that the game is not yet to be finished, step S3 is executed again. Thereafter, until it is determined that the game is to be finished in step S9, a process from steps S3 to S9 is repeatedly executed. On the other hand, when it is determined that the game is to be finished, the CPU 10 finishes the game processing shown in FIG. 13. This is the end of the description of the game processing.

As described above, according to the present embodiment, an operation of moving the controller 5 left and right allows the player object to perform an action as if its body undulates left and right in accordance with the operation. In other words, according to the present embodiment, the operation of moving the controller 5 allows a complex object composed of a plurality of parts to perform an action. Furthermore, the action of the object can be naturally expressed.

The above embodiment illustrates an example where the game apparatus 3 causes the player object and each of the joints of the player object to be moved on the predetermined plane in the three-dimensional space. In another embodiment, the game apparatus 3 may cause the player object and each of the joints to be moved in a three-dimensional manner. In this case, the game apparatus 3 may calculate a motion vector representing motions along two axes directions (e.g., X and Y-axes directions) based on the acceleration vector detected by the acceleration sensor 37, thereby varying the orientation of the adjacent bone in a three-dimensional manner based on the motion vector.

Furthermore, in the above embodiment, the front joint of the joints, which are connected to each other in a line, is set as the reference joint. However, the reference joint may not be the front joint. For example, in the case where a j-th joint counted from the front joint is the reference joint, one or more joints located behind the j-th joint may be moved in a similar manner to the above embodiment, and one or more joints located ahead of the j-th joint may be fixed. Furthermore, the one or more joints located ahead of the j-th joint may cause to be moved so as to be disposed on a line extending from the adjacent bone (a bone connecting the j-th joint to a (j+1)th joint). Alternatively, the one or more joints located ahead of the j-th joint may cause to be moved in a similar manner to the one or more joints located behind the j-th joint.

Furthermore, the above embodiment illustrates an example where the object is composed of the joints and bones. However, the present invention is not limited thereto. Only if the object is composed of a plurality of parts and connection relationships between the plurality of parts are changed, any object may be used. For example, assuming that the vertex of the polygon is each of the plurality of parts (each joint in the above embodiment) and a predetermined vertex is set as a reference point (reference joint), the game processing similar to that in the above embodiment can also be executed.

An object of the present invention is to cause a complex object to perform an action in accordance with a motion of an input device itself. For example, the present invention is applicable as a game apparatus, a game program and the like for executing a game which operates an object.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium storing an information processing program to be executed by a computer of an information processing device which causes an object in a virtual space to perform an action based on an input value varied in accordance with a motion of an input device, the object having a plurality of connection points connected to each other, and a shape of the object being determined based on positional relationships between the plurality of connection points, the information processing program causing the computer to:

obtain input data representing the input value;

calculate, when a predetermined one of the plurality of connection points of the object is set as a reference point, an orientation of an adjacent connection point connected to the reference point with respect to the reference point based on the input data;

move positions of the connection points other than the reference point based on the orientation calculated in the orientation calculating; and cause a display device to display the object in which the shape thereof is determined based on the positional relationships between the plurality of connection points obtained after the connection point moving;

wherein the orientation calculating includes:

calculating motion data representing the motion of the input device based on the input data; and calculating the orientation of the adjacent connection point with respect to the reference point based on the motion data;

wherein in obtaining the input data, the computer obtains acceleration data outputted from an acceleration sensor included in the input device as the input data; and wherein the motion calculating includes:

calculating smoothed data representing a value into which a value of the acceleration data obtained in the input data obtaining is smoothed; and calculating data, as the motion data, representing a difference between the value of the acceleration data obtained in the input data obtaining and the value represented by the smoothed data.

2. The computer-readable storage medium according to claim 1, wherein
in the connection point moving, the computer calculates the positions to be moved for the connection points other than the reference point in an order of a nearest to a furthest connection point from the reference point.

3. The computer-readable storage medium according to claim 2, wherein
the acceleration sensor detects acceleration of the input device along a predetermined axis direction, and
in the motion calculating, the computer calculates the motion data representing the motion of the input device in the predetermined axis direction.

4. The computer-readable storage medium according to claim 2, wherein
a reference orientation of the adjacent connection point with respect to the reference point is previously defined,
in the motion calculating, the computer calculates the motion data representing the motion of the input device in a predetermined direction, and
in the calculation executing, the computer determines a direction to which the orientation of the adjacent connection point with respect to the reference point is varied with respect to the reference orientation based on whether the motion of the input device represented by the motion data is a positive direction or a negative direction with respect to the predetermined direction.

5. The computer-readable storage medium according to claim 2, wherein
the information processing program causes the computer to move the object based on a movement amount, of each of the connection points other than the reference point, calculated in the connection point moving.

6. The computer-readable storage medium according to claim 5, wherein
the information processing program causes the computer to vary an orientation of the object based on an orientation of a line connecting an endmost connection point to a connection point connected thereto, both of which are included in the connection points other than the reference point.

7. The computer-readable storage medium according to claim 2, wherein
the information processing program causes the computer to vary an orientation of the object based on an orientation of a line connecting an endmost connection point included in the connection points other than the reference point to a connection point connected to the endmost connection point.

8. The computer-readable storage medium according to claim 1, wherein
the acceleration sensor detects acceleration of the input device along a predetermined axis direction, and
in the motion calculating, the computer calculates the motion data representing the motion of the input device in the predetermined axis direction.

9. The computer-readable storage medium according to claim 1, wherein
a reference orientation of the adjacent connection point with respect to the reference point is previously defined,
in the motion calculating, the computer calculates the motion data representing the motion of the input device in a predetermined direction, and
in the calculation executing, the computer determines a direction to which the orientation of the adjacent connection point with respect to the reference point is varied with respect to the reference orientation based on whether the motion of the input device represented by the motion data is a positive direction or a negative direction with respect to the predetermined direction.

10. The computer-readable storage medium according to claim 1, wherein
the information processing program causes the computer to move the object based on a movement amount, of each of the connection points other than the reference point, calculated in the connection point moving.

11. The computer-readable storage medium according to claim 10, wherein
the information processing program causes the computer to vary an orientation of the object based on an orientation of a line connecting an endmost connection point included in the connection points other than the reference point to a connection point connected to the endmost connection point.

12. The computer-readable storage medium according to claim 1, wherein
the information processing program causes the computer to vary an orientation of the object based on an orientation of a line connecting an endmost connection point included in the connection points other than the reference point to a connection point connected to the endmost connection point.

13. An information processing device which causes an object in a virtual space to perform an action based on an input value varied in accordance with a motion of an input device, the object having a plurality of connection points connected to each other, and a shape of the object being determined based on positional relationships between the plurality of connection points, the information processing device comprising:
input data obtaining means of obtaining input data representing the input data;
orientation calculating means of calculating, when a predetermined one of the plurality of connection points of the object is set as a reference point, an orientation of an adjacent connection point connected to the reference point with respect to the reference point based on the input data;
connection point moving means of moving positions of the connection points other than the reference point based on the orientation calculated in the orientation calculating means; and
display controlling means of causing a display device to display the object in which the shape thereof is determined based on the positional relationships between the plurality of connection points obtained by the connection point moving means,
wherein the orientation calculating means includes a processor configured to:
calculate motion data representing the motion of the input device based on the input data; and
calculate the orientation of the adjacent connection point with respect to the reference point based on the motion data;
wherein the input data obtaining means includes a processor configured to obtain acceleration data outputted from an acceleration sensor included in the input device as the input data; and
wherein the processor is further configured to calculate smoothed data representing a value into which a value of the acceleration data obtained in the input data obtaining step is smoothed; and to calculate data, as the motion data, representing a difference between the value of the acceleration data obtained in the input data obtaining step and the value represented by the smoothed data.

14. An information processing system which causes an object in a virtual space to perform an action based on an input value varied in accordance with a motion of an input device, the object having a plurality of connection points connected to each other, and a shape of the object being determined based on positional relationships between the plurality of connection points, the information processing device comprising:
- an input/output processor that obtains input data representing the input data;
- an orientation calculator configured to calculate, when a predetermined one of the plurality of connection points of the object is set as a reference point, an orientation of an adjacent connection point connected to the reference point with respect to the reference point based on the input data;
- a connection point mover configured to move positions of the connection points other than the reference point based on the orientation calculated in the orientation calculator; and
- a display controller that causes a display device to display the object in which the shape thereof is determined based on the positional relationships between the plurality of connection points obtained after the connection point mover wherein the orientation calculator includes:
- a motion calculator configured to calculate motion data representing the motion of the input device based on the input data, and to calculate the orientation of the adjacent connection point with respect to the reference point based on the motion data;

wherein in the input/ouptut processor obtains acceleration data outputted from an acceleration sensor included in the input device as the input data; and wherein the motion calculator is further configured to:
- calculate smoothed data representing a value into which a value of the acceleration data obtained in the input data obtaining step is smoothed; and
- calculate data, as the motion data, representing a difference between the value of the acceleration data obtained in the input data obtaining step and the value represented by the smoothed data.

15. An automatic method of processing information to cause an object in a virtual space to perform an action based on an input value varied in accordance with a motion of an input device, the object having a plurality of connection points connected to each other, and a shape of the object being determined based on positional relationships between the plurality of connection points, the method being automatically performed by at least one processor operatively coupled to the input device and to a display device, the method comprising:
- automatically using the processor, obtaining input data representing the input data;
- automatically using the processor, calculating, when a predetermined one of the plurality of connection points of the object is set as a reference point, an orientation of an adjacent connection point connected to the reference point with respect to the reference point based on the input data;
- automatically using the processor, moving positions of the connection points other than the reference point based on the calculated orientation; and
- automatically using the processor, causing the display device to display the object in which the shape thereof is determined based on the positional relationships between the plurality of connection points obtained by the moved connection points, wherein the orientation calculating includes:
- calculating motion data representing the motion of the input device based on the input data; and
- calculating the orientation of the adjacent connection point with respect to the reference point based on the motion data;

wherein in the input data obtaining, the computer obtains acceleration data outputted from an acceleration sensor included in the input device as the input data; and wherein the motion data calculating includes:
- calculating smoothed data representing a value into which a value of the acceleration data obtained in the input data obtaining step is smoothed; and
- calculating data, as the motion data, representing a difference between the value of the acceleration data obtained in the input data obtaining step and the value represented by the smoothed data.

* * * * *